(12) United States Patent
Lei et al.

(10) Patent No.: US 12,519,567 B2
(45) Date of Patent: Jan. 6, 2026

(54) RANDOM ACCESS MESSAGE DIFFERENTIATION

(71) Applicant: Qualcomm Incorporated, San Diego, CA (US)

(72) Inventors: Jing Lei, San Diego, CA (US); Ruiming Zheng, Beijing (CN); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 751 days.

(21) Appl. No.: 17/768,760

(22) PCT Filed: Nov. 3, 2020

(86) PCT No.: PCT/CN2020/126070
§ 371 (c)(1),
(2) Date: Apr. 13, 2022

(87) PCT Pub. No.: WO2021/088785
PCT Pub. Date: May 14, 2021

(65) Prior Publication Data
US 2023/0209604 A1   Jun. 29, 2023

(30) Foreign Application Priority Data
Nov. 5, 2019   (WO) ................ PCT/CN2019/115648

(51) Int. Cl.
*H04L 1/00*       (2006.01)
*H04W 74/00*      (2009.01)
*H04W 74/0833*    (2024.01)

(52) U.S. Cl.
CPC ......... *H04L 1/0063* (2013.01); *H04W 74/006* (2013.01); *H04W 74/0833* (2013.01)

(58) Field of Classification Search
CPC ..... H04W 52/02; H04W 72/20; H04W 88/08; H04W 76/27; H04W 16/28; H04W 56/00;
(Continued)

(56) References Cited

U.S. PATENT DOCUMENTS 9,867,211 B2    1/2018  Wijetunge et al.
2006/0239239 A1  10/2006  Yang
(Continued)

FOREIGN PATENT DOCUMENTS

CN      102883459 A     1/2013
CN      108289339 A     7/2018
(Continued)

OTHER PUBLICATIONS

European Search Report—EP24181029—Search Authority—The Hague—Sep. 2, 2024 (200400EPD1).
(Continued)

*Primary Examiner* — Iqbal Zaidi
(74) *Attorney, Agent, or Firm* — Guang Y. Zhang; Holland & Hart LLP

(57) ABSTRACT

Methods, systems, and devices for wireless communications are described to differentiate random access response types, such that a user equipment (UE) may identify a random access response for the UE. A UE may transmit a random access message that may be associated with a first type of random access response. The base station may be configured to communicate different types of random access responses, and may configure a random access response and an associated downlink control signal to correspond to the first type of random access response. The base station may transmit the downlink control signal to the UE by configuring different demodulation reference signals, different group identifiers, different search spaces or control resource sets, or different downlink control information. The UE may deter-
(Continued)

mine that the random access response is of the first type and may receive the random access response based on the decoded downlink control signal.

23 Claims, 19 Drawing Sheets

(58) Field of Classification Search
CPC ... H04W 74/0833; H04L 41/0654; H04L 5/00
See application file for complete search history.

(56) References Cited

U.S. PATENT DOCUMENTS

| | | | |
|---|---|---|---|
| 2018/0206206 A1* | 7/2018 | Tie | H04W 52/0229 |
| 2019/0110314 A1 | 4/2019 | Abedini et al. | |
| 2019/0215888 A1 | 7/2019 | Cirik et al. | |
| 2019/0289544 A1* | 9/2019 | Yi | H04W 72/56 |
| 2022/0225405 A1* | 7/2022 | Enbuske | H04W 74/085 |

FOREIGN PATENT DOCUMENTS

| | | |
|---|---|---|
| CN | 110312312 A | 10/2019 |
| WO | WO-2017052445 A1 | 3/2017 |
| WO | WO-2019055674 A1 | 3/2019 |

OTHER PUBLICATIONS

Qualcomm Incorporated: "Procedures for Two-Step RACH", 3GPP TSG-RAN WG1 Meeting #98bis, R1-1911406, Procedures for Two-Step RACH, 3rd Generation Partnership Project (3GPP), Mobile Competence Centre, 650, Route Des Lucioles, F-06921 Sophia-Antipolis Cedex, France, vol. RAN WG1, No. Chongqing, P.R. China, Oct. 14, 2019-Oct. 20, 2019, Oct. 22, 2019, XP051798680, 14 Pages, paragraph [ 03.1]—paragraph [ 03.2], figure 2.
Taiwan Search Report—TW109138603—TIPO—Feb. 21, 2024-02-21 (200400TW).
Qualcomm Incorporated: "Channel Structure for Two-Step RACH", 3GPP TSG-RAN WG1 Meeting #98, R1-1909239, 3rd Generation Partnership Project (3GPP), Mobile Competence Centre, 650, Route Des Lucioles, F-06921, Sophia-Antipolis Cedex, France, vol. RAN WG1, No. Prague, Czech Republic, Aug. 26, 2019-Aug. 30, 2019, Aug. 17, 2019, pp. 1-20, XP051765844, Paragraph [02.3], Proposal 11 to Proposal 14, Paragraph [0003].
Qualcomm Incorporated: "Procedures for Two-Step RACH", 3GPP TSG-RAN WG1 Meeting #98bis, R1-1911406, 3rd Generation Partnership Project (3GPP), Mobile Competence Centre, 650, Route Des Lucioles, F-06921, Sophia-Antipolis Cedex, France, vol. RAN WG1, No. Chongqing, P.R. China, Oct. 14, 2019-Oct. 20, 2019, Oct. 22, 2019, pp. 1-15, XP051798680, The Whole Document.
Supplementary European Search Report—EP20883688—Search Authority—The Hague—Oct. 31, 2023 (200400EP).
International Search Report and Written Opinion—PCT/CN2019/115648—ISA/EPO—Jul. 23, 2020 (200400WO1).
International Search Report and Written Opinion—PCT/CN2020/126070—ISA/EPO—Jan. 27, 2021 (200400WO2).

* cited by examiner

RANDOM ACCESS MESSAGE DIFFERENTIATION

CROSS REFERENCE TO RELATED APPLICATIONS

The present application is a 371 national stage filing of International PCT Application No. PCT/CN2020/126070 by Lei et. al., entitled "RANDOM ACCESS MESSAGE DIFFERENTIATION," filed Nov. 3, 2020; and claims priority to International Patent Application No. PCT/CN2019/115648 by Lei et. al., entitled "RANDOM ACCESS MESSAGE DIFFERENTIATION," filed Nov. 5, 2019, each of which is assigned to the assignee hereof, and each of which is expressly incorporated by reference in its entirety herein.

FIELD OF TECHNOLOGY

The following relates generally to wireless communications and more specifically to random access message differentiation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support random access message differentiation. Generally, the described techniques provide for differentiating random access response types, such that a user equipment (UE) may identify a random access response associated with a corresponding random access message transmitted by the UE. For example, a downlink control signal may indicate a type of a random access response associated with the downlink control signal. In a first example, a radio network temporary identifier (RNTI) of the downlink control signal may be calculated such that different types of random access responses are associated with different RNTIs. Additionally or alternatively, one or more demodulation reference signals (DMRSs) associated with the downlink control signal may indicate a type of random access response (e.g., via one or more DMRS patterns). In some cases, different search spaces or control resource sets (CORESETs) may be configured for different types of random access responses. In some cases, a field of the downlink control signal may indicate a type of random access response.

Accordingly, a UE may transmit a random access message to a base station to begin communications with the base station. The random access message may be associated with a first type of random access response, where the first type may be based on one or more of a random access channel (RACH) procedure, a UE capability, an uplink carrier, a response window length, or the like. The base station may be configured to communicate different types of random access responses, such as types including the first type and a second type of random access response. The base station may receive the random access message and may configure a random access response and an associated downlink control signal to correspond to the first type of random access response. For example, the downlink control signal may indicate that the random access response is of the first type. The base station may transmit the downlink control signal to the UE, and the UE may attempt to decode the downlink control signal and one or more other downlink control signals. Based on the attempted decoding, the UE may determine that the random access response is of the first type and may receive the random access response.

A method of wireless communication at a UE is described. The method may include transmitting, to a base station supporting a first type and a second type of a random access response during a random access procedure, a random access message associated with the first type of the random access response, decoding, based on having transmitted the random access message of the first type, a set of downlink control signals in a search space of a downlink control channel to receive the random access response of the first type, and receiving the random access response of the first type for the UE in at least one of the set of downlink control signals based on decoding the set of downlink control signals.

An apparatus for wireless communication at a UE is described. The apparatus may include a processor, memory coupled with the processor, and instructions stored in the memory. The instructions may be executable by the processor to cause the apparatus to transmit, to a base station supporting a first type and a second type of a random access response during a random access procedure, a random access message associated with the first type of the random access response, decode, based on having transmitted the random access message of the first type, a set of downlink control signals in a search space of a downlink control channel to receive the random access response of the first type, and receive the random access response of the first type for the UE in at least one of the set of downlink control signals based on decoding the set of downlink control signals.

Another apparatus for wireless communication at a UE is described. The apparatus may include means for transmitting, to a base station supporting a first type and a second type of a random access response during a random access procedure, a random access message associated with the first type of the random access response, decoding, based on having transmitted the random access message of the first type, a set of downlink control signals in a search space of a downlink control channel to receive the random access response of the first type, and receiving the random access response of the first type for the UE in at least one of the set of downlink control signals based on decoding the set of downlink control signals.

A non-transitory computer-readable medium storing code for wireless communication at a UE is described. The code may include instructions executable by a processor to transmit, to a base station supporting a first type and a second type of a random access response during a random access procedure, a random access message associated with the first type of the random access response, decode, based on having transmitted the random access message of the first type, a set of downlink control signals in a search space of a downlink control channel to receive the random access response of the first type, and receive the random access response of the first type for the UE in at least one of the set of downlink control signals based on decoding the set of downlink control signals.

In some examples of the method, apparatuses, and non-transitory computer-readable medium described herein, the first type and the second type of the random access response correspond to one or more of different types of random access procedure, different capabilities of the UE, different types of uplink carrier, or different lengths of a random access response window.

In some examples of the method, apparatuses, and non-transitory computer-readable medium described herein, the random access response of the first type may be multiplexed with at least one random access response for at least one other UE.

In some examples of the method, apparatuses, and non-transitory computer-readable medium described herein, decoding the set of downlink control signals further may include operations, features, means, or instructions for determining a group RNTI associated with a group of UEs, including the UE, where the group RNTI may be based on the first type of the random access response, and descrambling cyclic redundancy check (CRC) bits of the set of downlink control signals using the group RNTI, where downlink control messages corresponding to the second type fail the descrambling.

Some examples of the method, apparatuses, and non-transitory computer-readable medium described herein may further include operations, features, means, or instructions for determining that a first downlink control signal of the set of downlink control signals may be decodable using the group RNTI based on descrambling the CRC bits, and decoding the first downlink control signal based on the determining, where the random access response of the first type may be received based on decoding the first downlink control signal.

Some examples of the method, apparatuses, and non-transitory computer-readable medium described herein may further include operations, features, means, or instructions for determining that a second downlink control signal of the set of downlink control signals may be undecodable using the group RNTI based on descrambling the CRC bits, and aborting decoding of the second downlink control signal based on the determining.

In some examples of the method, apparatuses, and non-transitory computer-readable medium described herein, decoding the set of downlink control signals further may include operations, features, means, or instructions for extracting a DMRS associated with the downlink control channel and performing a channel estimation based on a decorrelation of the DMRS signal.

Some examples of the method, apparatuses, and non-transitory computer-readable medium described herein may further include operations, features, means, or instructions for determining that a first downlink control signal of the set of downlink control signals may be decodable using the DMRS signal for channel estimation based on descrambling the CRC bits, and decoding the first downlink control signal based on the determining, where the random access response of the first type may be received based on decoding the first downlink control signal.

Some examples of the method, apparatuses, and non-transitory computer-readable medium described herein may further include operations, features, means, or instructions for determining that a second downlink control signal of the set of downlink control signals may be undecodable using the DMRS signal for channel estimation based on descrambling the CRC bits, and aborting decoding of the second downlink control signal based on the determining.

In some examples of the method, apparatuses, and non-transitory computer-readable medium described herein, determining the group RNTI may include operations, features, means, or instructions for calculating the group RNTI based on a random access response window length and a number of bits associated with the group RNTI.

In some examples of the method, apparatuses, and non-transitory computer-readable medium described herein, determining the group RNTI may include operations, features, means, or instructions for calculating the group RNTI based on a maximum value associated with a second group RNTI corresponding to the second type.

In some examples of the method, apparatuses, and non-transitory computer-readable medium described herein, decoding the set of downlink control signals further may include operations, features, means, or instructions for determining that a first downlink control signal of the set of downlink control signals may be associated with the first type based on a mapping of DMRSs corresponding to the first downlink control signal, and decoding the first downlink control signal based on the determining, where the random access response of the first type may be received based on decoding the first downlink control signal.

In some examples of the method, apparatuses, and non-transitory computer-readable medium described herein, the mapping of the DMRSs includes one or more of a DMRS scrambling identifier, a frequency offset in resource element mapping, an orthogonal cover code (OCC) pattern, or a code division multiplexing (CDM) pattern, or a combination thereof.

In some examples of the method, apparatuses, and non-transitory computer-readable medium described herein, the mapping of the DMRSs includes information corresponding to a number of bits and indicating a type of random access response.

Some examples of the method, apparatuses, and non-transitory computer-readable medium described herein may further include operations, features, means, or instructions for determining, based on the mapping of the DMRSs, a group RNTI associated with a group of UEs, including the UE, and descrambling CRC bits of the set of downlink control signals using the group RNTI.

Some examples of the method, apparatuses, and non-transitory computer-readable medium described herein may further include operations, features, means, or instructions for generating multiple hypotheses corresponding to the mapping of DMRSs of the set of downlink control signals, and performing a cross-correlation based on the multiple hypotheses and the set of downlink control signals, where the first downlink control signal may be determined to be associated with the first type based on performing the cross-correlation.

In some examples of the method, apparatuses, and non-transitory computer-readable medium described herein, decoding the set of downlink control signals further may include operations, features, means, or instructions for determining that a first downlink control signal may be associated with the first type based on a CORESET or search space, or a combination thereof, associated with the first downlink control signal, and decoding the first downlink control signal based on the determining, where the random access response of the first type may be received based on decoding the first downlink control signal.

In some examples of the method, apparatuses, and non-transitory computer-readable medium described herein, the CORESET or the search space, or a combination thereof, may be associated with a bandwidth part corresponding to the first type.

In some examples of the method, apparatuses, and non-transitory computer-readable medium described herein, decoding the set of downlink control signals further may include operations, features, means, or instructions for determining that a first downlink control signal may be associated with the first type based on identifying a field of the first downlink control signal, and decoding the first downlink control signal based on the determining, where the random access response of the first type may be received based on decoding the first downlink control signal.

In some examples of the method, apparatuses, and non-transitory computer-readable medium described herein, the field corresponds to one or more of a reserved field of a downlink control information (DCI) or a DCI field dedicated to indicating a type of random access response, or a combination thereof.

Some examples of the method, apparatuses, and non-transitory computer-readable medium described herein may further include operations, features, means, or instructions for determining a group RNTI based on the transmitted random access message, the group RNTI associated with a group of UEs, including the UE, descrambling CRC bits of the set of downlink control signals using the group RNTI, determining that a first set of downlink control signals may be decodable and that a second set of downlink control signals may be undecodable based on descrambling the CRC bits using the group RNTI, and aborting decoding of the second set of downlink control signals based on determining that the second set of downlink control signals may be undecodable.

Some examples of the method, apparatuses, and non-transitory computer-readable medium described herein may further include operations, features, means, or instructions for decoding a second field associated with the first set of downlink control signals, where the field of the first downlink control signal may be identified based on the decoding, and aborting decoding of one or more other random access responses associated with downlink control signals of the first set different from the first downlink control signal based on decoding the second field.

A method of wireless communication at a base station is described. The method may include receiving, from a UE, a random access message associated with a first type of a random access response, the base station supporting the first type and a second type of a random access response during a random access procedure, determining, at least in part in response to the received random access message, a downlink control signal including the random access response of the first type, and transmitting the downlink control signal to the UE in a downlink control channel.

An apparatus for wireless communication at a base station is described. The apparatus may include a processor, memory coupled with the processor, and instructions stored in the memory. The instructions may be executable by the processor to cause the apparatus to receive, from a UE, a random access message associated with a first type of a random access response, the base station supporting the first type and a second type of a random access response during a random access procedure, determine, at least in part in response to the received random access message, a downlink control signal including the random access response of the first type, and transmit the downlink control signal to the UE in a downlink control channel.

Another apparatus for wireless communication at a base station is described. The apparatus may include means for receiving, from a UE, a random access message associated with a first type of a random access response, the base station supporting the first type and a second type of a random access response during a random access procedure, determining, at least in part in response to the received random access message, a downlink control signal including the random access response of the first type, and transmitting the downlink control signal to the UE in a downlink control channel.

A non-transitory computer-readable medium storing code for wireless communication at a base station is described. The code may include instructions executable by a processor to receive, from a UE, a random access message associated with a first type of a random access response, the base station supporting the first type and a second type of a random access response during a random access procedure, determine, at least in part in response to the received random access message, a downlink control signal including the random access response of the first type, and transmit the downlink control signal to the UE in a downlink control channel.

Some examples of the method, apparatuses, and non-transitory computer-readable medium described herein may further include operations, features, means, or instructions for transmitting the random access response of the first type to the UE based on transmitting the downlink control signal to the UE.

In some examples of the method, apparatuses, and non-transitory computer-readable medium described herein, the first type and the second type of the random access response correspond to one or more of different types of random access procedure, different capabilities of the UE, different types of uplink carrier, or different lengths of a random access response window.

In some examples of the method, apparatuses, and non-transitory computer-readable medium described herein, the random access response of the first type may be multiplexed with at least one random access response for at least one other UE.

In some examples of the method, apparatuses, and non-transitory computer-readable medium described herein, determining the downlink control signal further may include operations, features, means, or instructions for determining a group RNTI associated with a group of UEs, including the UE, where the group RNTI may be based on the first type of the random access response, and scrambling CRC bits of the downlink control signal using the group RNTI.

Some examples of the method, apparatuses, and non-transitory computer-readable medium described herein may further include operations, features, means, or instructions for scrambling one or more other CRC bits of one or more other downlink control signals of the second type using a second group RNTI different from the group RNTI, where downlink control messages corresponding to the second type may be undecodable using the group RNTI.

In some examples of the method, apparatuses, and non-transitory computer-readable medium described herein, determining the group RNTI may include operations, features, means, or instructions for calculating the group RNTI based on a random access response window length and a number of bits associated with the group RNTI.

In some examples of the method, apparatuses, and non-transitory computer-readable medium described herein, determining the group RNTI may include operations, features, means, or instructions for calculating the group RNTI based on a maximum value associated with a second group RNTI corresponding to the second type.

In some examples of the method, apparatuses, and non-transitory computer-readable medium described herein, determining the downlink control signal further may include operations, features, means, or instructions for mapping DMRSs corresponding to the downlink control signal based on the first type of random access response.

In some examples of the method, apparatuses, and non-transitory computer-readable medium described herein, the mapping of the DMRSs includes one or more of a DMRS scrambling identifier, a frequency offset in resource element mapping, an OCC pattern, or a CDM pattern, or a combination thereof.

In some examples of the method, apparatuses, and non-transitory computer-readable medium described herein, the mapping of the DMRSs includes information corresponding to a number of bits and indicating a type of random access response.

Some examples of the method, apparatuses, and non-transitory computer-readable medium described herein may further include operations, features, means, or instructions for determining, based on the mapping of the DMRSs, a group RNTI associated with a group of UEs, including the UE, and scrambling CRC bits of the downlink control signal using the group RNTI.

In some examples of the method, apparatuses, and non-transitory computer-readable medium described herein, determining the downlink control signal further may include operations, features, means, or instructions for determining a CORESET or search space, or a combination thereof, associated with the downlink control signal based on the first type of random access response.

In some examples of the method, apparatuses, and non-transitory computer-readable medium described herein, the CORESET or the search space may be associated with a bandwidth part corresponding to the first type.

In some examples of the method, apparatuses, and non-transitory computer-readable medium described herein, determining the downlink control signal further may include operations, features, means, or instructions for determining a field of the downlink control signal based on the first type of random access response.

In some examples of the method, apparatuses, and non-transitory computer-readable medium described herein, the field corresponds to one or more of a reserved field of a DCI or a DCI field dedicated to indicating a type of random access response, or a combination thereof.

Some examples of the method, apparatuses, and non-transitory computer-readable medium described herein may further include operations, features, means, or instructions for determining a group RNTI based on the received random access message, the group RNTI associated with a group of UEs, including the UE, and scrambling CRC bits of the downlink control signal using the group RNTI.

DETAILED DESCRIPTION

Figure 1:
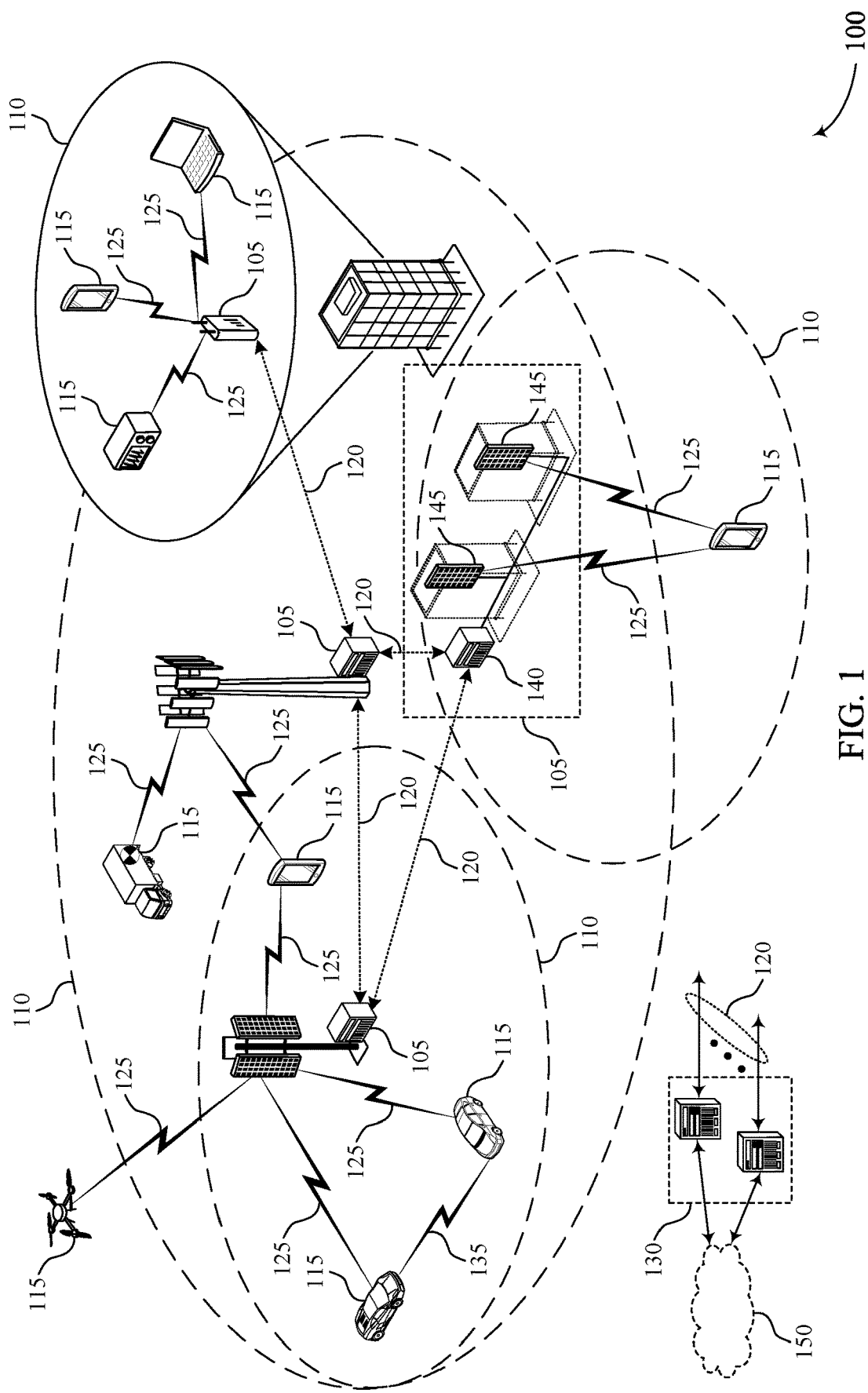
FIG. 1 illustrates an example of a wireless communications system that supports random access message differentiation in accordance with aspects of the present disclosure.

In some wireless communications systems, multiple user equipments (UEs) may each transmit a random access message (e.g., a random access signal) to a base station to begin communications with the base station. The base station may (e.g., at least in part in response to the random access messages) transmit a random access response to each of the UEs. In some cases, each random access message may indicate a type of random access response associated with the respective random access message. For example, a random access response type may be based on UE capabilities, a random access channel (RACH) procedure type, a random access response window length, or an uplink carrier configuration, among other examples. An occasion of a random access procedure (e.g., a RACH occasion) may include time and frequency resources used by a UE to transmit a random access message, and may be associated with a set of preambles (e.g., RACH preambles) for the random access procedure (e.g., RACH procedure). A UE transmitting a random access message may select a preamble associated with the RACH occasion, and may include the preamble in the random access message. In some cases, a RACH preamble may indicate or be associated with a type of random access response (e.g., different subsets of RACH preambles may be associated with different random access response types).

A UE may transmit a random access message to a base station (e.g., using a RACH occasion), and the base station may transmit a random access response to the UE to schedule communication resources, assign an identifier (ID), or the like (e.g., in response to the random access message). The random access response may be scheduled via a downlink control signal, and the random access response or the downlink control signal may indicate one or more intended recipient UEs. For example, the base station may transmit a downlink control signal scrambled by a group radio network temporary identifier (RNTI) associated with the one or more intended recipient UEs. In some cases, the base station may multiplex multiple random access responses for UEs sharing a same RACH occasion. The base station may schedule the multiplexed random access responses via a downlink control signal and may scramble the downlink control signal using a RNTI (e.g., a group RNTI, such as random access RNTI (RA-RNTI)) that applies to all of the UEs intended to receive the random access response.

For example, each UE transmitting a random access message in a same RACH occasion may determine (e.g., calculate) and use a same RNTI for decoding the downlink control signal. A RNTI may be determined based on a RACH occasion, and RACH occasions may repeat in successive radio frames. Accordingly, a same RACH occasion (e.g., having a same symbol, slot, and frequency index) across multiple radio frames may be associated with a same RNTI. A random access response may be transmitted within at least one radio frame from an associated random access message in order to avoid ambiguity among UEs sharing a same RNTI over different radio frames.

In some examples, a window length for a random access response may be different for different random access response types. For example, different window lengths may support latency reduction, different UE capabilities, or unlicensed spectrum usage, among other examples. Thus, different types of random access responses may be associated with different respective window lengths. Random access messages corresponding to different types of random access responses may also share a same RACH occasion (e.g., for transmission of random access messages), either in a same radio frame or a different radio frame. As such, different types of random access responses (e.g., with different response windows) that share a same RACH occasion may share a same RNTI, although the random access responses may be received at different times or in different radio frames. Sharing a RNTI across different types of random access responses in this manner may introduce ambiguity for a UE when attempting to identify a random access response for the UE. Such ambiguity may result in a reduced capacity when performing RACH procedures.

For example, two random access messages transmitted by two different UEs may share a same RACH occasion, where a first random access message may correspond to a first type of random access response (e.g., a first group) and a second random access message may correspond to a second type of random access response (e.g., a second group). A base station may receive the random access messages and may transmit random access responses at different times or in different radio frames. The two UEs may determine a RNTI (e.g., a group RNTI) for a respective random access response, and because the random access messages share the same RACH occasion the random access responses may share a same RNTI (e.g., even though they are transmitted at different times). Accordingly, the two UEs may determine that either of the two random access responses corresponds to the respective UE or random access message, without being able to identify which random access response is intended for which UE.

The present disclosure provides techniques for differentiating random access responses, such that a UE may identify a random access response associated with a corresponding random access message. For example, a downlink control signal may indicate a type of a random access response associated with the downlink control signal. In a first example, a RNTI of the downlink control signal may be calculated such that different types of random access responses are associated with different RNTIs. Additionally or alternatively, one or more demodulation reference signals (DMRSs) associated with the downlink control signal may indicate a type of random access response (e.g., via one or more DMRS patterns). In some cases, different search spaces or CORESETs may be configured for different types of random access responses. In some cases, a field of the downlink control signal may indicate a type of random access response.

Aspects of the disclosure are initially described in the context of wireless communications systems. Aspects of the disclosure are further illustrated by and described with reference to a messaging scheme, a process flow, apparatus diagrams, system diagrams, and flowcharts that relate to random access message differentiation.

FIG. 1 illustrates an example of a wireless communications system 100 that supports random access message differentiation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

UEs 115 may participate in random access procedures to establish communications with a base station 105. For example, two or more UEs 115 may transmit different random access messages to a base station, where the random access messages may share a same RACH occasion (e.g., a same symbol, slot, and frequency index). A first random access message may correspond to a first type of random access response and a second random access message may correspond to a second type of random access response. A base station 105 may receive the random access messages and may transmit random access responses at different times or in different radio frames. In some cases, the UEs 115 may be unable to identify which random access response is intended for which UE 115.

Accordingly, a base station 105 may differentiate random access responses, such that a UE 115 may identify a random access response associated with a corresponding random access message. For example, a downlink control signal may indicate a type of a random access response associated with the downlink control signal. A RNTI of the downlink control signal may be calculated such that different types of random access responses are associated with different RNTIs. Additionally or alternatively, one or more DMRSs associated with the downlink control signal may indicate a type of random access response. In some cases, different search spaces or CORESETs may be configured for different types of random access responses or a field of the downlink control signal may indicate a type of random access response.

Figure 2:
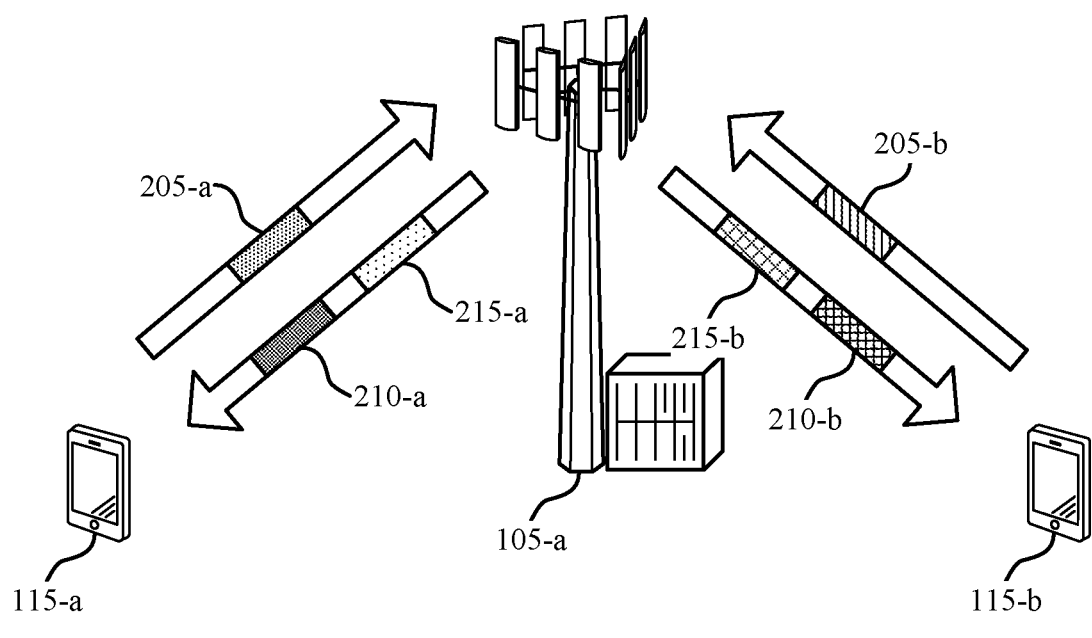
FIG. 2 illustrates an example of a wireless communications system that supports random access message differentiation in accordance with aspects of the present disclosure.

FIG. 2 illustrates an example of a wireless communications system 200 that supports random access message differentiation in accordance with aspects of the present disclosure. In some examples, wireless communications system 200 may implement aspects of wireless communication system 100. Wireless communications system 200 may include a base station 105-a and UEs 115-a and 115-b, which may be examples of a base station 105 and UEs 115 described with reference to FIG. 1. UEs 115-a and 115-b may transmit random access messages 205 (e.g., random access messages 205-a and 205-b) to base station 105-a to begin communications with base station 105-a. Base station 105-a may (e.g., in response to random access messages 205-a and 205-b) transmit a random access response 215-a to UE 115-a and a random access response 215-b to UE 115-b. In some cases, each random access message 205 may indicate a type of random access response 215 associated with the respective random access message 205. For example, a type of random access response 215 may be based on one or more random access groups, such as a group based on UE capabilities, a RACH procedure type, a random access response window, or an uplink carrier configuration, among other examples. Base station 105-a may support multiple types of random access responses 215 (e.g., for different groups of UEs 115).

A RACH occasion (e.g., time and frequency resources for a random access message 205) may be associated with a set of RACH preambles (e.g., 64 preambles). A UE 115 transmitting a random access message 205 in the RACH occasion may select a preamble that may be included in the random access message 205. In some cases, a RACH preamble may indicate or be associated with a type of random access response 215. For example, a first set of preambles of a RACH occasion (e.g., a first 32 preambles) may correspond to UEs 115 performing two-step RACH procedures and a second set of preambles of the RACH occasion (e.g., a remaining 32 preambles) may correspond to UEs 115 performing four-step RACH procedures. Additionally or alternatively, a third set of RACH preambles may correspond to UEs 115 with a first type of capabilities (e.g., UEs 115 with reduced capabilities) and a fourth set of RACH preambles may correspond to UEs 115 with a second type of capabilities (e.g., other UEs 115, such as UEs 115 with premium capabilities). A preamble selected by the UE 115 and transmitted via the random access message 205 may indicate one or more of these groups and therefore a type of random access response 215.

The UE 115 may transmit the random access message 205 to a base station 105, and the base station 105 may transmit a random access response 215 to the UE 115 to schedule communication resources, assign an ID, or the like (e.g., in response to the random access message 205). The random access response 215 may be scheduled via a downlink control signal 210, and the random access response 215 or the downlink control signal 210 may indicate one or more intended recipient UEs 115. For example, the base station 105 may transmit a downlink control signal 210 scrambled by a group RNTI associated with the one or more intended recipient UEs 115.

In some cases, a base station 105 may multiplex multiple random access responses 215 in a same MAC protocol data unit (PDU) for UEs 115 sharing a same RACH occasion (e.g., a same symbol, slot, and frequency index), where the MAC PDU may be scheduled by a downlink control signal 210 scrambled by a RNTI that applies to each of the UEs 115. In some examples, a window length for a random access response 215 may be different for different random access response types. For example, a first window length may be used for UEs 115 using lower latency communications, in order to support a specific latency for the random access response 215. Additionally or alternatively, a second window length (e.g., a larger window length) may be used for UEs 115 with reduced capabilities to accommodate a relaxed timeline for the random access response 215. In some cases, a third window length may be used for UEs 115 operating on unlicensed spectrum to account for time taken by the network to capture a channel for sending the random access response 215 (e.g., the third window length may be longer to avoid missing a later random access response 215). Thus, different types of random access responses 215 may be associated with different respective window lengths.

Random access messages 205-a and 205-b may share a same RACH occasion, where random access message 205-a may correspond to a first type of random access response 215-a and random access message 205-b may correspond to a second type of random access response 215-b. In some cases, base station 105-a may transmit random access responses 215-a and 215-b at different times or in different radio frames. In order to avoid ambiguity and support random access response identification while reducing complexity for UEs 115, base station 105-a may employ the methods described herein to differentiate random access responses 215-a and 215-b.

The present disclosure provides techniques for differentiating random access responses 215, such that UEs 115 (e.g., UEs 115-a and 115-b) may identify a random access response 215 associated with a corresponding random access message 205. For example, a downlink control signal 210 may indicate a type of a random access response 215 associated with the downlink control signal 210. A base station 105 (e.g., base station 105-a) may use one or more methods to configure a downlink control signal 210 and differentiate random access responses 215 for different groups of UEs 115. A UE 115 (e.g., UE 115-a and/or 115-b) may use information associated with the downlink control signal 210 to determine whether a random access response 215 is associated with the UE 115 or with a different UE 115. For example, base station 105-a may prepare random access responses 215-a and 215-b, along with corresponding downlink control signals 210-a and 210-b, where downlink control signals 210-a and 210-b may convey or indicate information regarding a type of random access response 215.

In a first example, base station 105-a may use a formula to calculate RNTIs associated with the downlink control signals 210-a and 210-b such that different types of random access responses 215 may be associated with different RNTIs (e.g., different group RNTIs). In one example, the RNTI may be given by the equation:

$$\text{RNTI} = \mathrm{mod}(\mathrm{off} + 1 + s_{id} + 14 \times t_{id} + 14 \times 80 \times (f_{id} + 8 \times (\mathrm{ul}_{id} + \mathrm{mod}(\mathrm{SFN}, 2^K))), 2^Q), \quad (1)$$

where mod is a modular operation, off is an offset constant corresponding to random access response type differentiation, $s_{id}$ is an index of a first OFDM symbol of the RACH occasion and $0 \leq s_{id} < 14$, $t_{id}$ is an index of a first slot of the RACH occasion in a system frame and $0 \leq t_{id} < 80$, $f_{id}$ is an index of the RACH occasion in a frequency domain and $0 \leq f_{id} < 8$, $\mathrm{ul}_{id}$ is an uplink carrier used for random access preamble transmission where a normal uplink (NUL) carrier $\mathrm{ul}_{id} = 0$ and a supplemental uplink (SUL) carrier $\mathrm{ul}_{id} = 1$, SFN is an SFN of the RACH occasion, K is a parameter associated with random access response window length where the window length is $10 \times 2^K$ ms, and Q is a number of bits assigned to the RNTI and Q≥16.

Group RNTIs (G-RNTIs) calculated using equation (1), or a similar equation, may have different RNTI values for different types of random access responses 215 (e.g., different RACH procedure types, different UE capabilities, different response window lengths, or different uplink carriers). For example, an offset parameter (e.g., off), may be set to a value of zero for four-step RACH procedures and may be set to a maximum four-step RACH RNTI value for two-step RACH procedures. Additionally or alternatively, when calculating a RNTI for UEs 115 having a first set of capabilities (e.g., reduced capabilities), an offset parameter may be set to a maximum RNTI value of UEs 115 having a second set of capabilities (e.g., other UEs 115).

UE 115-a may, for example, calculate an RNTI using a formula similar to equation (1) and may attempt to descramble a cyclic redundancy check (CRC) (e.g., descramble CRC bits) of downlink control signals 210-a and 210-b using the RNTI. Similarly, base station 105-a may calculate a first RNTI corresponding to downlink control signal 210-a and a second RNTI corresponding to downlink control signal 210-b. Base station 105-a may scramble the CRCs of downlink control signals 210-a and 210-b using the corresponding RNTIs. In some cases, the first RNTI calculated by base station 105-a may be a same RNTI as the RNTI calculated by UE 115-a and the second RNTI may be a different RNTI (e.g., corresponding to a different type of random access response 215, such as random access response 215-b). Accordingly, UE 115-a may successfully descramble the CRC of downlink control signal 210-a and may fail to descramble the CRC of downlink control signal 210-b.

UE 115-a may determine that downlink control signal 210-a and corresponding random access response 215-a are expected (e.g., based on descrambling the CRC) and may continue decoding downlink control signal 210-a (e.g., and corresponding random access response 215-a). Additionally, UE 115-a may determine that downlink control signal 210-b and corresponding random access response 215-b are not expected (e.g., based on failing to descramble the CRC) and may abort decoding of the downlink control signal 210-b (e.g., and corresponding random access response 215-b).

In a second example, a random access response type may be indicated or based on a DMRS mapping (e.g., DMRS resource mapping) of a corresponding downlink control signal 210. For example, the DMRS mapping may convey information in the form of a number of bits (e.g., one or two bits) indicating a type of random access response 215. In some cases, DMRS mappings may indicate different types of random access responses 215 via one or more of: different DMRS scrambling IDs, different frequency offsets in resource element (RE) mapping, different orthogonal cover code (OCC) patterns for DMRS, or different code division multiplexing (CDM) patterns for DMRS (e.g., in a multi-symbol CORESET or search space). A UE 115 may be configured with one or more relations between DMRS mapping and random access response types, and may use the one or more relations to identify a type of random access response 215. In some cases, DMRS patterns may be used jointly with the RNTI methods described herein to indicate a type of random access response 215.

For example, base station 105-a may configure a DMRS mapping (e.g., using one or more methods) of downlink control signals 210-a and 210-b according to the respective types of random access responses 215-a and 215-b. For example, base station 105-a may configure the DMRS mapping of downlink control signal 210-a according to a first mapping corresponding to a first type of random access response 215 (e.g., random access response 215-a) and may configure the DMRS mapping of downlink control signal 210-b according to a second mapping corresponding to a second type of random access response 215 (e.g., random access response 215-b). UE 115-a may attempt to decode downlink control signals 210-a and 210-b and may encounter the DMRS mapping of each respective downlink control signal 210. UE 115-a may determine that downlink control signal 210-a is associated with a first type of random access response 215 based on the DMRS mapping, which may be the type of random access response 215-a associated with random access message 205-a. Similarly, UE 115-a may determine that downlink control signal 210-b is not associated with random access message 205-a based on the associated DMRS mapping. As such, UE 115-a may decode downlink control signal 210-a and corresponding random access response 215-a and may determine to abort decoding downlink control signal 210-b and random access response 215-b.

In a third example, base station 105-a may transmit downlink control signals 210-a and 210-b in a CORESET or a search space corresponding to the respective type of random access responses 215-a and 215-b. For example, base station 105-a may transmit downlink control signal 210-a in a first CORESET corresponding to a first type of random access response 215 (e.g., random access response 215-a) and may transmit downlink control signal 210-b in a second CORESET corresponding to a second type of random access response 215 (random access response 215-b). UE 115-a may monitor the first CORESET for a response to random access message 205-a (e.g., UE 115-a may be configured with or receive instructions to monitor the first CORESET) and may receive downlink control signal 210-a in the first CORESET. In some cases, the different CORESETs or search spaces may be included in different BWPs. For example, a different BWP may be configured for a reduced-capability UE 115 for power savings.

In a fourth example, a base station 105 may indicate a type of random access response 215 in the associated downlink control signal 210. In some cases, the indication may be included in a field of a downlink control information (DCI), such as a reserved or unused field of an existing DCI format. In some other cases, the indication may be included in a DCI format that defines a field for information corresponding to types of random access responses 215 (e.g., differentiation information).

For example, base station 105-a may calculate RNTIs corresponding to downlink control signals 210-a and 210-b and may scramble the CRCs of downlink control signals 210-a and 210-b using the RNTIs. UE 115-a may attempt to descramble the CRC of downlink control signals 210-a and 210-b based on an RNTI calculated by UE 115-a and may successfully descramble downlink control signal 210-a. In some cases, UE 115-a may fail to descramble the CRC of downlink control signal 210-b and may abort decoding downlink control signal 210-b and corresponding random access response 215-b. In some other cases, UE 115-a may successfully descramble downlink control signal 210-b using the RNTI assigned to UE 115-a.

UE 115-a may proceed to decode the downlink control signals(s) 210 associated with successfully descrambled CRCs (e.g., downlink control signals 210-a and 210-b). UE 115-a may use information in the downlink control signal(s)

210 (e.g., a field in a DCI) to determine a type of random access response 215 associated with the corresponding downlink control signal 210. If the type of random access response 215 matches a type associated with random access message 205-a, UE 115-a may determine that the downlink control signal 210 is expected and may decode the corresponding random access response 215. For example, UE 115-a may determine, based on respective fields in downlink control signals 210-a and 210-b, that downlink control signal 210-a is expected (e.g., corresponds to a same type of random access response 215 as random access message 205-a). UE 115-a may also determine that downlink control signal 210-b is not expected (e.g., corresponds to a different type of random access response 215). Accordingly, UE 115-a may decode random access response 215-a and may abort decoding random access response 215-b.

Based on one or more of the techniques described herein, UE 115-a may use information in the random access response 215-a to begin communications with base station 105-a (e.g., uplink and/or downlink communications).

Figure 3:
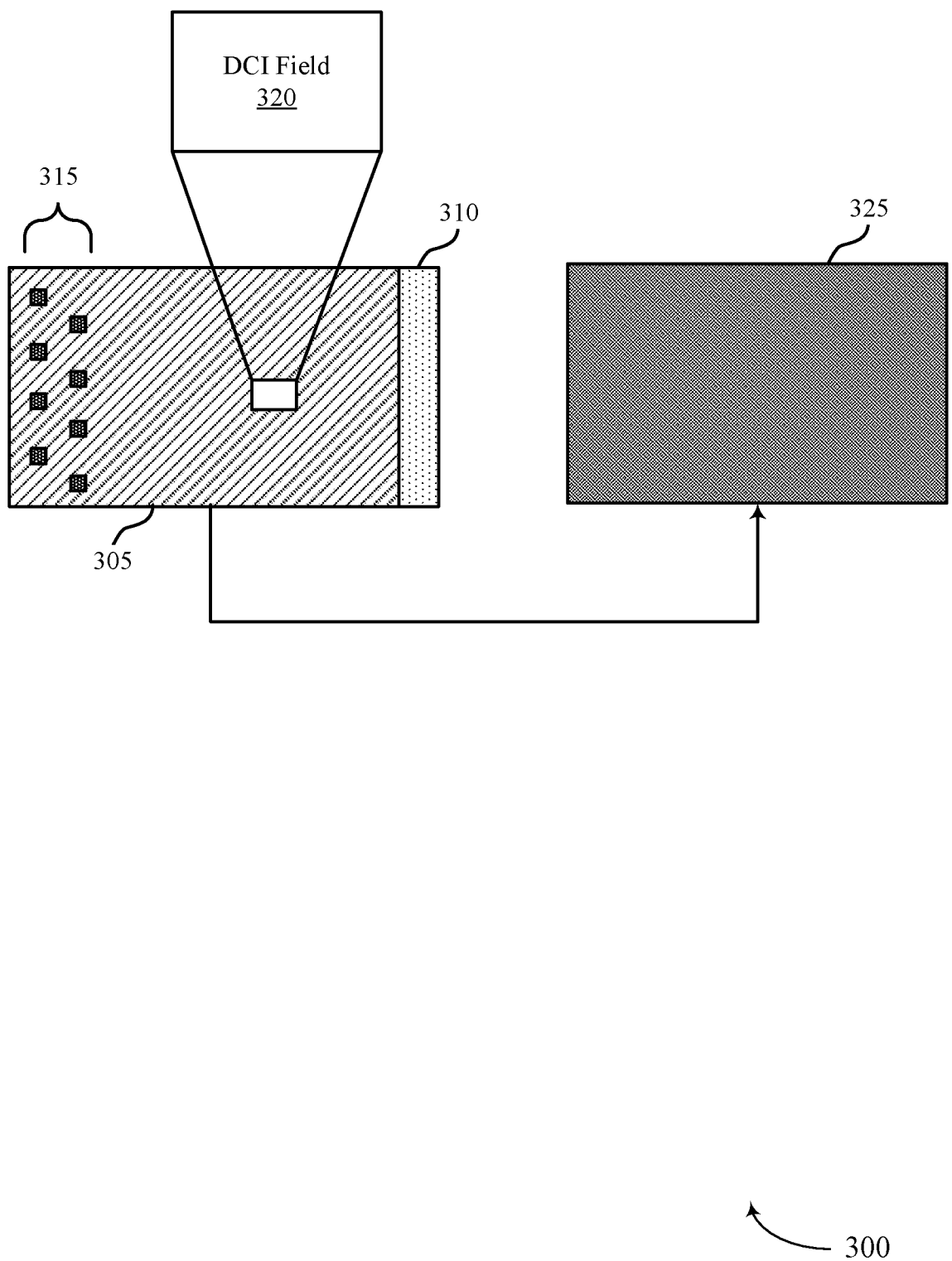
FIG. 3 illustrates an example of a messaging scheme that supports random access message differentiation in accordance with aspects of the present disclosure.

FIG. 3 illustrates an example of a messaging scheme 300 that supports random access message differentiation in accordance with aspects of the present disclosure. In some examples, messaging scheme 300 may implement aspects of wireless communications systems 100 or 200. For example, a base station 105 may transmit a downlink control signal 305 (e.g., a DCI) to a UE 115, where the downlink control signal 305 may indicate a type of random access response 325 that is associated with the downlink control signal 305. The UE 115 and the base station 105 may be examples of a UE 115 and a base station 105 described with reference to FIGS. 1 and 2. The UE 115 may use the information in the downlink control signal 305 to determine whether the random access response 325 is intended for the UE 115 (e.g., based on the type of the random access response 325). The base station 105 may transmit the random access response 325 and the UE 115 may receive or may abort decoding the random access response 325 based on the information in the downlink control signal 305.

In a first example, the base station 105 may determine a RNTI associated with the downlink control signal 305 such that the RNTI may be associated with a type of random access response 325. The base station 105 may determine a RNTI for downlink control signal 305 (e.g., based on the type of random access response 325) and may scramble a CRC 310 of the downlink control signal 305 using the RNTI. The UE 115 may determine a RNTI associated with the UE 115, and associated with the expected type of random access response 325, and may attempt to descramble the CRC 310 using the RNTI. In some cases, the RNTI determined by base station 105 may be a different RNTI than the RNTI calculated by the UE 115 and the UE 115 may fail to descramble the CRC 310 and may abort decoding the downlink control signal 305 and random access response 325. In some cases, the RNTI determined by base station 105 may be a same RNTI as the RNTI calculated by the UE 115 and the UE 115 may successfully descramble the CRC 310 and may continue decoding downlink control signal 305 and random access response 325.

In a second example, the base station 105 may indicate the type of the random access response 325 via a mapping of DMRS 315 associated with the downlink control signal 305. The type of random access response 325 may be indicated via one or more of a DMRS scrambling ID, a frequency offset in RE mapping, an OCC patterns for DMRS 315, or a CDM pattern for DMRS 315. In some cases, a number of DMRS scrambling IDs available to the network may be configured to match a number of possible random access response types. The DMRS 315 may have a semi-persistent mapping pattern and parameters (e.g., signaled via RRC) and the UE 115 may attempt to match the mapping pattern or one or more other parameters with a known mapping pattern or parameters associated with a type of random access response 325. For example, the UE 115 may generate multiple hypotheses for the DMRS 315 (e.g., the DMRS sequence) and may perform a cross-correlation of the multiple hypotheses with the DMRS 315 in the received downlink control signal 305 (e.g., where each hypothesis may be associated with a type of random access response 325). If the UE 115 is unable to correlate one or more hypotheses with the DMRS 315, the UE 115 may generate one or more new hypotheses and may perform another cross-correlation.

The DMRS 315 may convey random access response type information to the UE 115 corresponding to a number of bits (e.g., one or two bits). In some cases, the indication of random access response type via DMRS 315 may be used jointly with the RNTI associated with the type of random access response 325. In some cases, the indication of the type of random access response 325 via DMRS 315 may be used independently of the RNTI associated with the type of random access response 325. When the DMRS 315 and the RNTI are used together, the RNTI value may be determined using a same method as when determined separately or may be determined using a different (e.g., simplified) method. For example, information that is fully or partially mapped to the DMRS 315 may be omitted or modified when determining the RNTI (e.g., uplink carrier information).

If the DMRS 315 conveys information indicating that the type of random access response 325 is different than a type expected by the UE 115, the UE 115 may abort decoding the downlink control signal 305 and random access response 325. If the DMRS 315 conveys information indicating that the type of random access response 325 is a same type as the type expected by the UE 115, the UE 115 may continue decoding downlink control signal 305 and random access response 325.

In a third example, the base station 105 may indicate a type of random access response 325 in the downlink control signal 305 (e.g., in a payload of the downlink control signal 305). In some cases, the indication may be included in a field 320 (e.g., two or three bits) of a DCI, such as a reserved or unused field 320 of an existing DCI format. In some other cases, the indication may be included in a field 320 of a DCI format that defines the field 320 (e.g., two or three bits) for information corresponding to types of random access responses 325 (e.g., differentiation information).

If the downlink control signal 305 indicates that the type of random access response 325 is different than a type expected by the UE 115, the UE 115 may abort decoding the downlink control signal 305 and random access response 325. If the downlink control signal 305 indicates that the type of random access response 325 is a same type as the type expected by the UE 115, the UE 115 may continue decoding downlink control signal 305 and random access response 325.

In any of the examples described herein, the UE 115 may use the information in the downlink control signal 305 to determine a type of the random access response 325. If the type is expected by the UE 115, the UE 115 may determine that the random access response 325 is expected and may decode the random access response 325 based on the downlink control signal 305.

Figure 4:
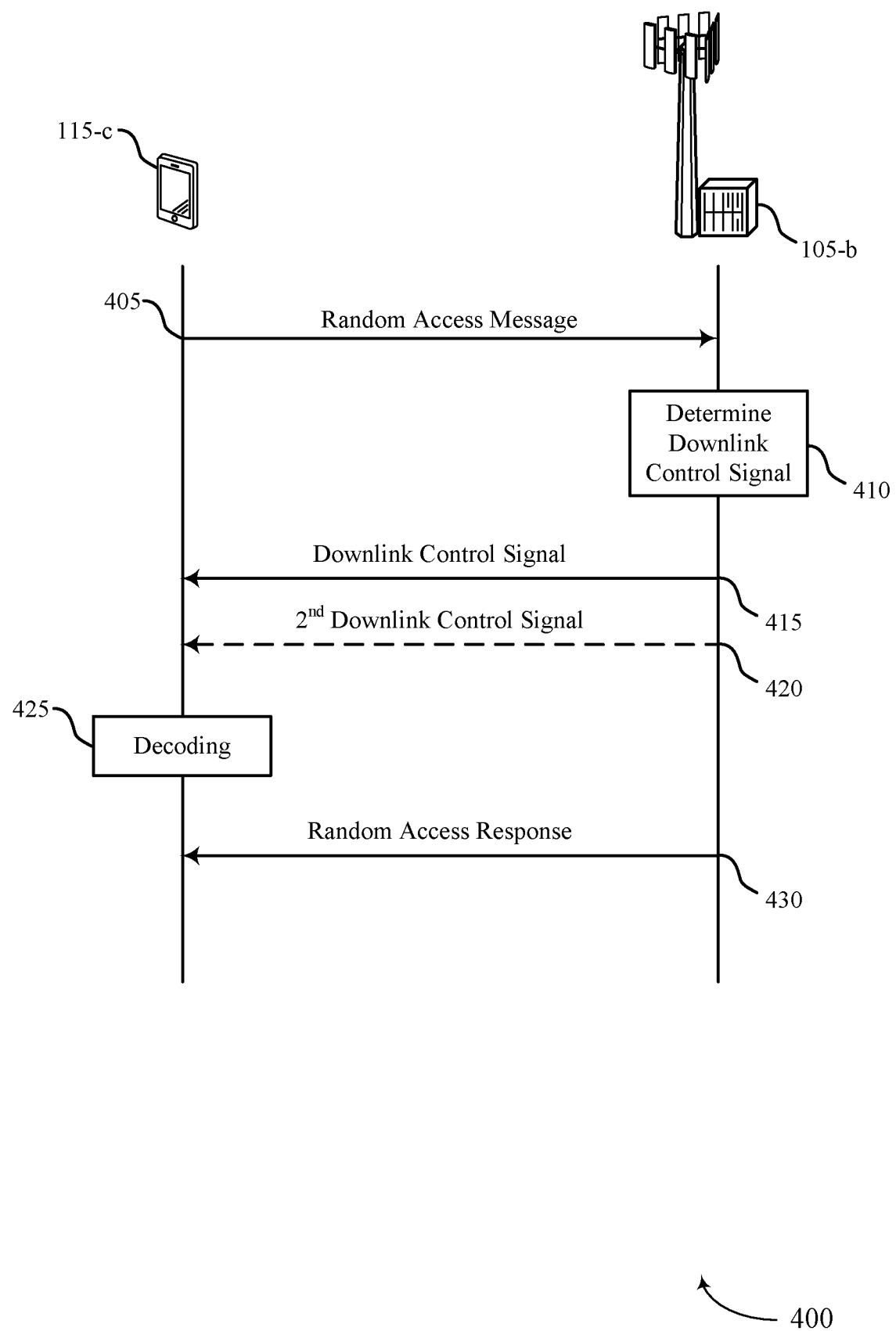
FIG. 4 illustrates an example of a process flow that supports random access message differentiation in accordance with aspects of the present disclosure.

FIG. 4 illustrates an example of a process flow 400 that supports random access message differentiation in accordance with aspects of the present disclosure. In some examples, process flow 400 may be implemented by, or relate to, aspects of wireless communications systems 100 or 200. Process flow 400 may also implement aspects of messaging scheme 300. Process flow 400 may be implemented by a base station 105-b and a UE 115-c, which may be examples of a base station 105 and a UE 115 described with reference to FIGS. 1-3. In some cases, base station 105-b may transmit a random access response to UE 115-c and may indicate a type of the random access response via a downlink control signal associated with the random access response.

In the following description of the process flow 400, the operations between the UE 115-c and the base station 105-b may be transmitted in a different order than the order shown, or the operations performed by the base station 105-b or the UE 115-c may be performed in different orders or at different times. Some operations may also be left out of the process flow 400, or other operations may be added to the process flow 400. Although the base station 105-b and the UE 115-c are shown performing the operations of process flow 400, some aspects of some operations may also be performed by another wireless device.

At 405, UE 115-c may initiate a random access procedure by transmitting, to base station 105-b, a random access message associated with a first type of random access response. Base station 105-b may support the first type and a second type of a random access response, among other possible types of random access responses, during random access procedures.

At 410, base station 105-b may determine a downlink control signal including the random access response of the first type based on the received random access message. Base station 105-b may determine the downlink control signal to include information indicating that the random access response is of the first type. For example, a RNTI of the downlink control signal may be calculated based on the type of the random access response. Additionally or alternatively, one or more DMRSs associated with the downlink control signal may indicate a type of random access response (e.g., via one or more DMRS patterns). In some cases, a search space or CORESET may be configured for a type of random access response or a field of the downlink control signal may indicate a type of random access response.

At 415, base station 105-b may transmit the downlink control signal to UE 115-c in a downlink control channel (e.g., a physical downlink control channel (PDCCH)). The downlink control signal may include the random access response of the first type and may be associated with the random access response of the first type.

At 420, base station 105-b may transmit a second downlink control signal corresponding to the second type of random access response (e.g., intended for a different UE 115).

At 425, UE 115-c may decode, based on transmitting the random access message, multiple downlink control signals in a search space of a downlink control channel (e.g., in order to receive the random access response of the first type). For example, UE 115-c may decode multiple downlink control signals from base station 105-b. In some cases, UE 115-c may decode the multiple downlink control signals in the search space based on the search space being associated with the first type of random access response.

In some cases, the multiple downlink signals may include at least one downlink signal corresponding to the first type of random access response and one downlink signal corresponding to the second type of random access response. In some cases, UE 115-c may decode the downlink control signal and may attempt to descramble the CRC of the downlink control signal, may compare a pattern of DMRS of the downlink control signal, and/or may decode one or more fields of the downlink control signal. In some cases, based on decoding the downlink control signal, UE 115-c may continue decoding the downlink control signal and a corresponding random access response (e.g., due to a CRC pass, a matching DMRS pattern, or a field indicating the first type).

In some cases, UE 115-c may decode the second downlink control signal and may attempt to descramble the CRC of the second downlink control signal, may compare a pattern of DMRS of the second downlink control signal, and/or may decode one or more fields of the second downlink control signal. In some cases, based on decoding the second downlink control signal, UE 115-c may abort decoding the second downlink control signal and a corresponding random access response (e.g., due to a CRC fail, a mismatched DMRS pattern, or a field indicating the second type).

At 430, base station 105-b may transmit the random access response of the first type to UE 115-c based on transmitting the downlink control signal to UE 115-c. UE 115-c may receive the random access response of the first type based on decoding the multiple downlink control signals (e.g., including the downlink control signal and the second downlink control signal). UE 115-c may use information in the random access response to begin communications with base station 105-b (e.g., uplink and/or downlink communications).

Figure 5:
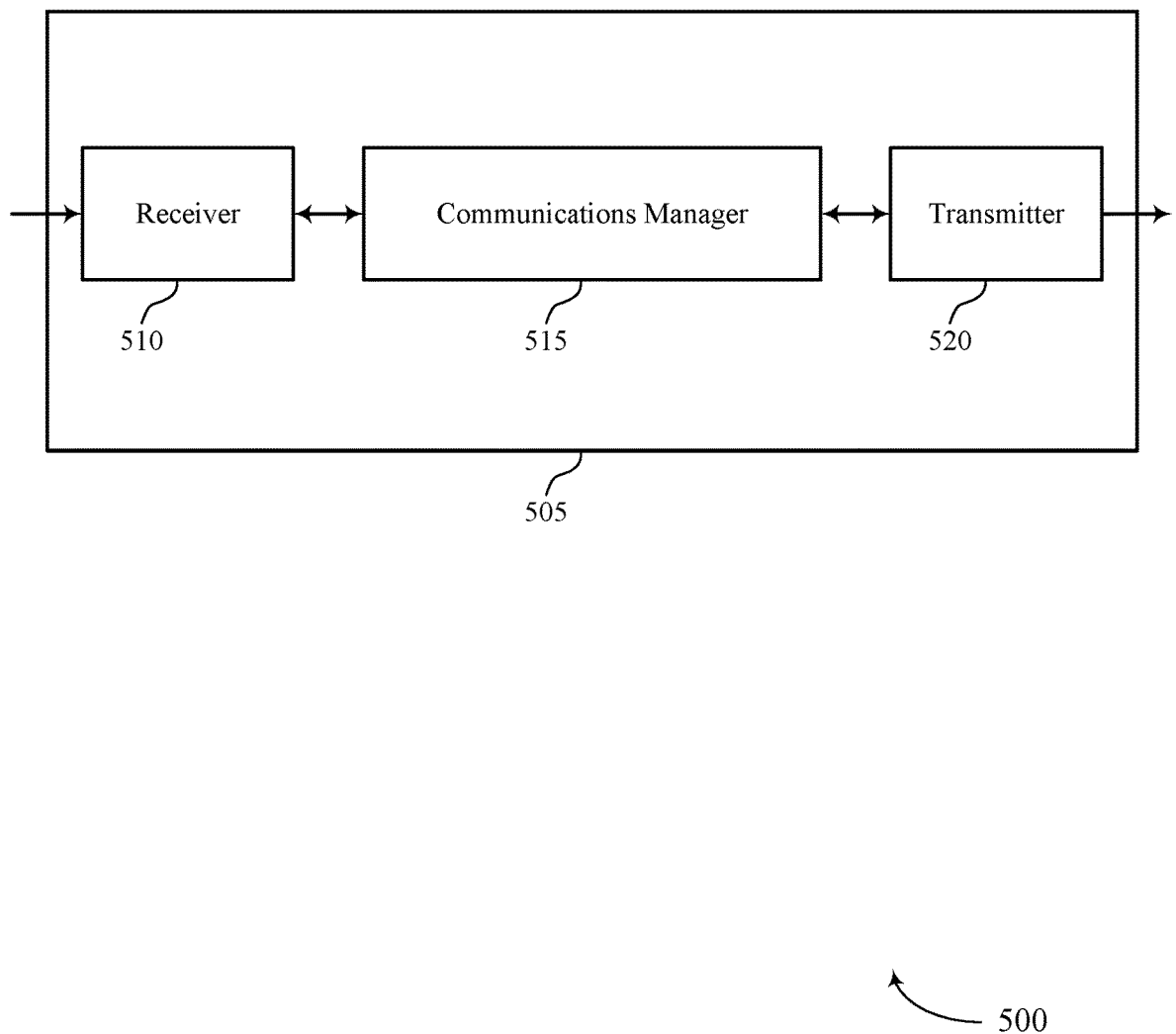
FIGS. 5 and 6 show block diagrams of devices that support random access message differentiation in accordance with aspects of the present disclosure.

FIG. 5 shows a block diagram 500 of a device 505 that supports random access message differentiation in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to random access message differentiation, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit, to a base station supporting a first type and a second type of a random access response during a random access procedure, a random access message associated with the first type of the random access response, decode, based on having transmitted the random access message of the first type, multiple downlink control signals in a search space of a downlink control channel to receive the random access response of the first type, and receive the random access response of the first type for the UE in at least one of the multiple downlink control signals based on decoding the multiple downlink control signals. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The actions performed by the communications manager 515 as described herein may be implemented to realize one or more potential advantages. For example, communications manager 515 may increase communication reliability and decrease communication latency at a UE 115 by enabling the UE 115 to identify a random access response intended for the UE 115, which may reduce transmission delays, improve transmission accuracy, and reduce retransmissions. Similarly, communications manager 515 may save power and increase battery life at a UE 115 by identifying random access responses with reduced complexity for the UE 115.

Figure 6:
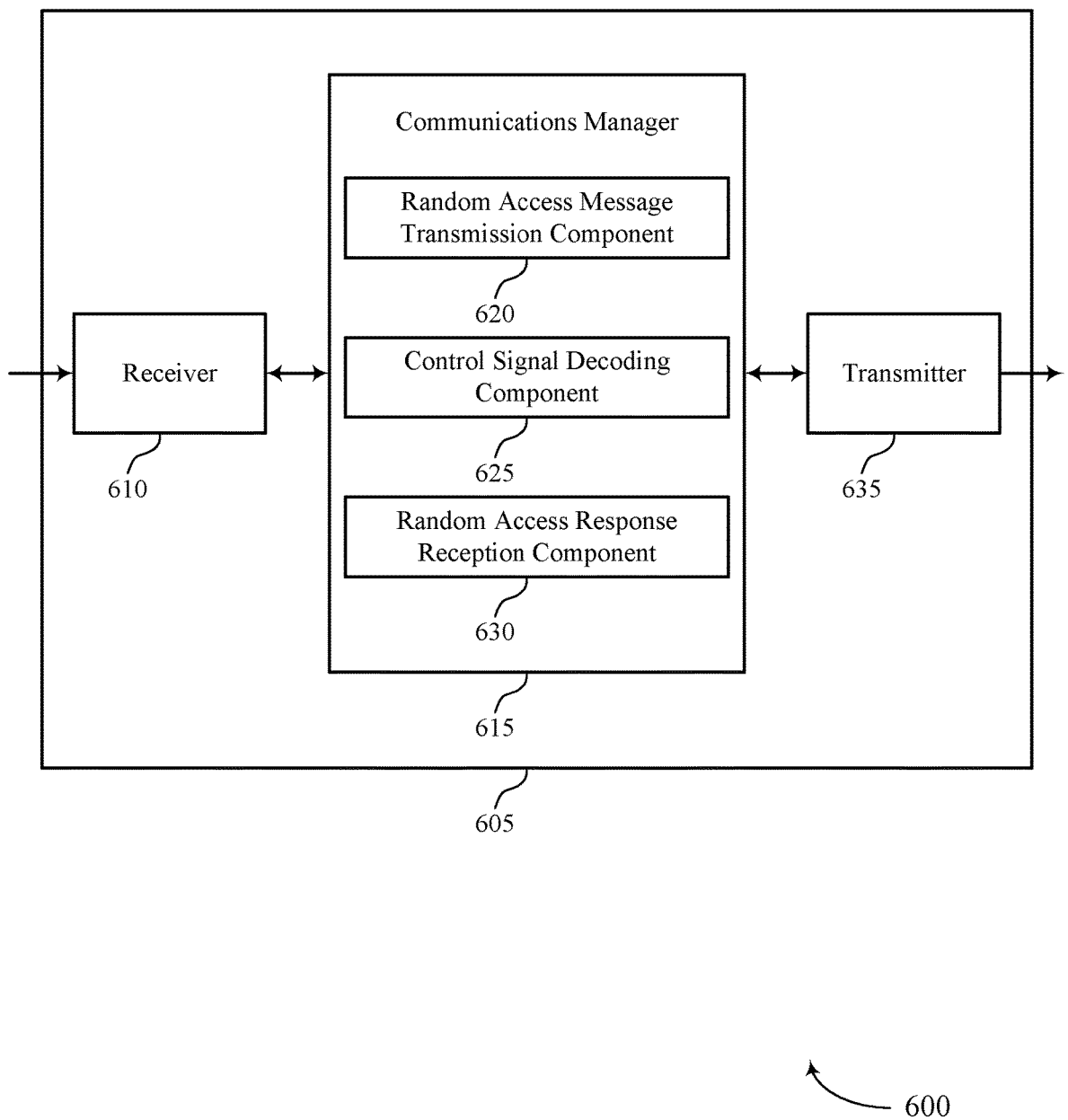

FIG. 6 shows a block diagram 600 of a device 605 that supports random access message differentiation in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to random access message differentiation, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a random access message transmission component 620, a control signal decoding component 625, and a random access response reception component 630. The communications manager 615 may be an example of aspects of the communications manager 810 described herein.

The random access message transmission component 620 may transmit, to a base station supporting a first type and a second type of a random access response during a random access procedure, a random access message associated with the first type of the random access response. The control signal decoding component 625 may decode, based on having transmitted the random access message of the first type, multiple downlink control signals in a search space of a downlink control channel to receive the random access response of the first type. The random access response reception component 630 may receive the random access response of the first type for the UE in at least one of the multiple downlink control signals based on decoding the multiple downlink control signals.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

A processor of a UE 115 (for example, controlling the receiver 610, the transmitter 635, or the transceiver 820 as described with reference to FIG. 8) may increase communication reliability and accuracy by enabling the UE 115 to identify a random access response intended for the UE 115, which may increase reliability and reduce latency (e.g., via implementation of system components described with reference to FIG. 7). Further, the processor of the UE 115 may identify one or more aspects of a downlink control signal to perform the processes described herein. The processor of the UE 115 may identify random access responses intended for the UE 115 to save power and increase battery life at the UE 115 (e.g., by identifying random access responses with reduced complexity for the UE 115).

Figure 7:
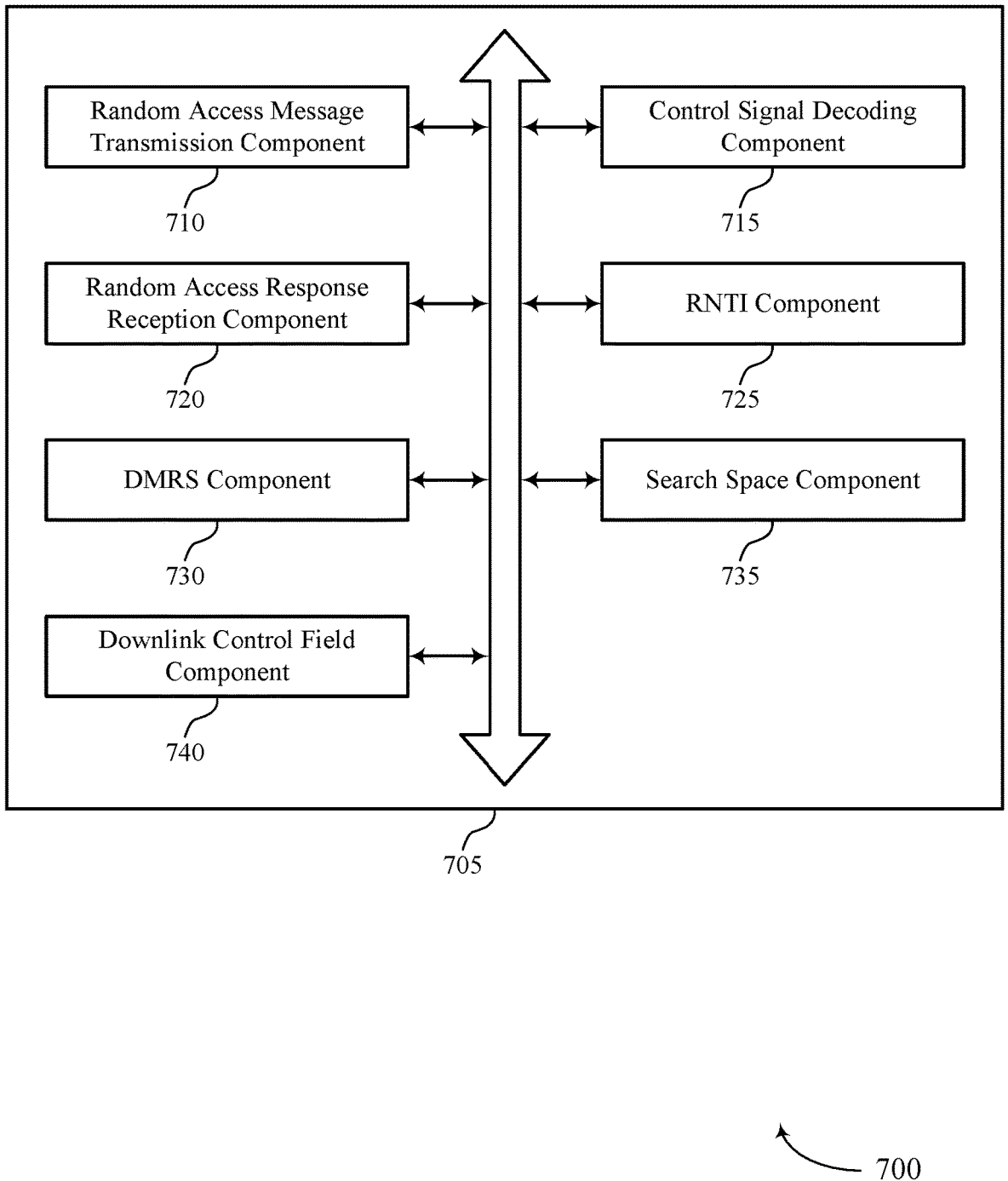
FIG. 7 shows a block diagram of a communications manager that supports random access message differentiation in accordance with aspects of the present disclosure.

FIG. 7 shows a block diagram 700 of a communications manager 705 that supports random access message differentiation in accordance with aspects of the present disclosure. The communications manager 705 may be an example of aspects of a communications manager 515, a communications manager 615, or a communications manager 810 described herein. The communications manager 705 may include a random access message transmission component 710, a control signal decoding component 715, a random access response reception component 720, a RNTI component 725, a DMRS component 730, a search space component 735, and a downlink control field component 740. Each of these modules may communicate, directly or indirectly, with one another (e.g., via one or more buses).

The random access message transmission component 710 may transmit, to a base station supporting a first type and a second type of a random access response during a random access procedure, a random access message associated with the first type of the random access response.

The control signal decoding component 715 may decode, based on having transmitted the random access message of the first type, multiple downlink control signals in a search space of a downlink control channel to receive the random access response of the first type.

The random access response reception component 720 may receive the random access response of the first type for the UE in at least one of the multiple downlink control signals based on decoding the multiple downlink control signals. In some cases, the first type and the second type of the random access response correspond to one or more of different types of random access procedure, different capabilities of the UE, different types of uplink carrier, or different lengths of a random access response window. In some cases, the random access response of the first type is multiplexed with at least one random access response for at least one other UE.

The RNTI component 725 may determine a group RNTI associated with a group of UEs, including the UE, where the group RNTI is based on the first type of the random access response. In some examples, the RNTI component 725 may descramble CRC bits of the multiple downlink control signals using the group RNTI, where downlink control messages corresponding to the second type fail the descrambling. In some examples, the RNTI component 725 may determine that a first downlink control signal of the multiple downlink control signals is decodable using the group RNTI based on descrambling the CRC bits. In some examples, the RNTI component 725 may decode the first downlink control signal based on the determining, where the random access response of the first type is received based on decoding the first downlink control signal.

In some examples, the RNTI component 725 may determine that a second downlink control signal of the multiple downlink control signals is undecodable using the group RNTI based on descrambling the CRC bits. In some examples, the RNTI component 725 may abort decoding of the second downlink control signal based on the determining. In some examples, the RNTI component 725 may calculate the group RNTI based on a random access response window length and a number of bits associated with the group RNTI. In some examples, the RNTI component 725 may calculate the group RNTI based on a maximum value associated with a second group RNTI corresponding to the second type.

The DMRS component 730 may extract a DMRS associated with the downlink control channel and perform a channel estimation based on a decorrelation of the DMRS signal. In some examples, the DMRS component 730 may determine that a first downlink control signal of the multiple downlink control signals is decodable using the DMRS signal for channel estimation based on descrambling the CRC bits. In some examples, the DMRS component 730 may decode the first downlink control signal based on the determining, where the random access response of the first type is received based on decoding the first downlink control signal. In some examples, the DMRS component 730 may determine that a second downlink control signal of the multiple downlink control signals is undecodable using the DMRS signal for channel estimation based on descrambling the CRC bits. In some examples, the DMRS component 730 may abort decoding of the second downlink control signal based on the determining.

The DMRS component 730 may determine that a first downlink control signal of the multiple downlink control signals is associated with the first type based on a mapping of DMRSs corresponding to the first downlink control signal. In some examples, the DMRS component 730 may decode the first downlink control signal based on the determining, where the random access response of the first type is received based on decoding the first downlink control signal. In some examples, the DMRS component 730 may determine, based on the mapping of the DMRSs, a group RNTI associated with a group of UEs, including the UE.

In some examples, the DMRS component 730 may descramble CRC bits of the multiple downlink control signals using the group RNTI. In some examples, the DMRS component 730 may generate multiple hypotheses corresponding to the mapping of DMRSs of the multiple downlink control signals. In some examples, the DMRS component 730 may perform a cross-correlation based on the multiple hypotheses and the multiple downlink control signals, where the first downlink control signal is determined to be associated with the first type based on performing the cross-correlation.

In some cases, the mapping of the DMRSs includes one or more of a DMRS scrambling identifier, a frequency offset in resource element mapping, an OCC pattern, or a CDM pattern, or a combination thereof. In some cases, the mapping of the DMRSs includes information corresponding to a number of bits and indicating a type of random access response.

The search space component 735 may determine that a first downlink control signal is associated with the first type based on a CORESET or search space, or a combination thereof, associated with the first downlink control signal. In some examples, the search space component 735 may decode the first downlink control signal based on the determining, where the random access response of the first type is received based on decoding the first downlink control signal. In some cases, the CORESET or the search space, or a combination thereof, is associated with a bandwidth part corresponding to the first type.

The downlink control field component 740 may determine that a first downlink control signal is associated with the first type based on identifying a field of the first downlink control signal. In some examples, the downlink control field component 740 may decode the first downlink control signal based on the determining, where the random access response of the first type is received based on decoding the first downlink control signal. In some cases, the field corresponds to one or more of a reserved field of a DCI or a DCI field dedicated to indicating a type of random access response, or a combination thereof.

In some examples, the downlink control field component 740 may determine a group RNTI based on the transmitted random access message, the group RNTI associated with a group of UEs, including the UE. In some examples, the downlink control field component 740 may descramble CRC bits of the multiple downlink control signals using the group RNTI. In some examples, the downlink control field component 740 may determine that a first set of downlink control signals is decodable and that a second set of downlink control signals is undecodable based on descrambling the CRC bits using the group RNTI.

In some examples, the downlink control field component 740 may abort decoding of the second set of downlink control signals based on determining that the second set of downlink control signals is undecodable. In some examples, the downlink control field component 740 may decode a second field associated with the first set of downlink control signals, where the field of the first downlink control signal is identified based on the decoding. In some examples, the downlink control field component 740 may abort decoding of one or more other random access responses associated with downlink control signals of the first set different from the first downlink control signal based on decoding the second field.

Figure 8:
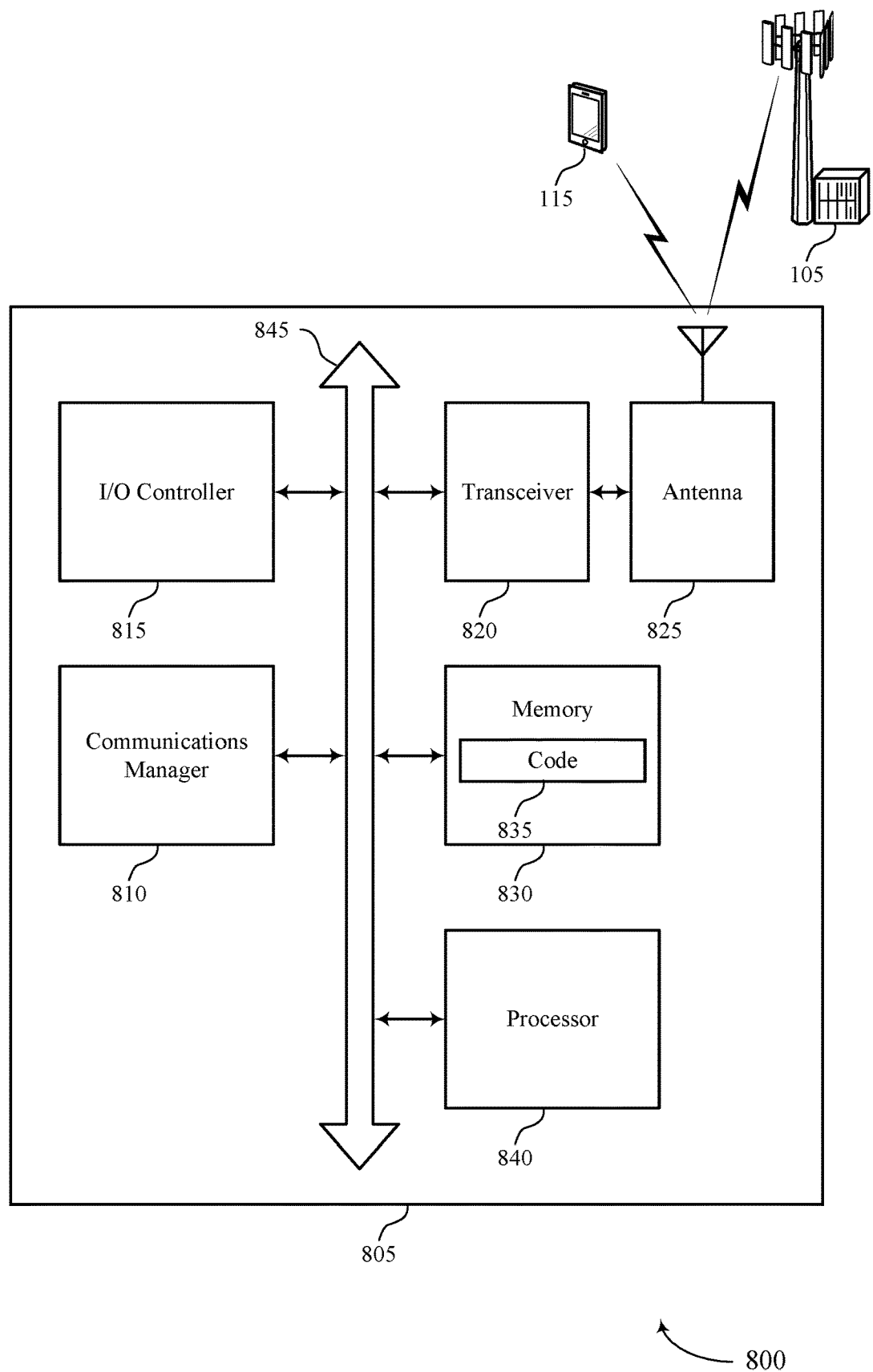
FIG. 8 shows a diagram of a system including a device that supports random access message differentiation in accordance with aspects of the present disclosure.

FIG. 8 shows a diagram of a system 800 including a device 805 that supports random access message differentiation in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit, to a base station supporting a first type and a second type of a random access response during a random access procedure, a random access message associated with the first type of the random access response, decode, based on having transmitted the random access message of the first type, multiple downlink control signals in a search space of a downlink control channel to receive the random access response of the first type, and receive the random access response of the first type for the UE in at least one of the multiple downlink control signals based on decoding the multiple downlink control signals.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting random access message differentiation).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
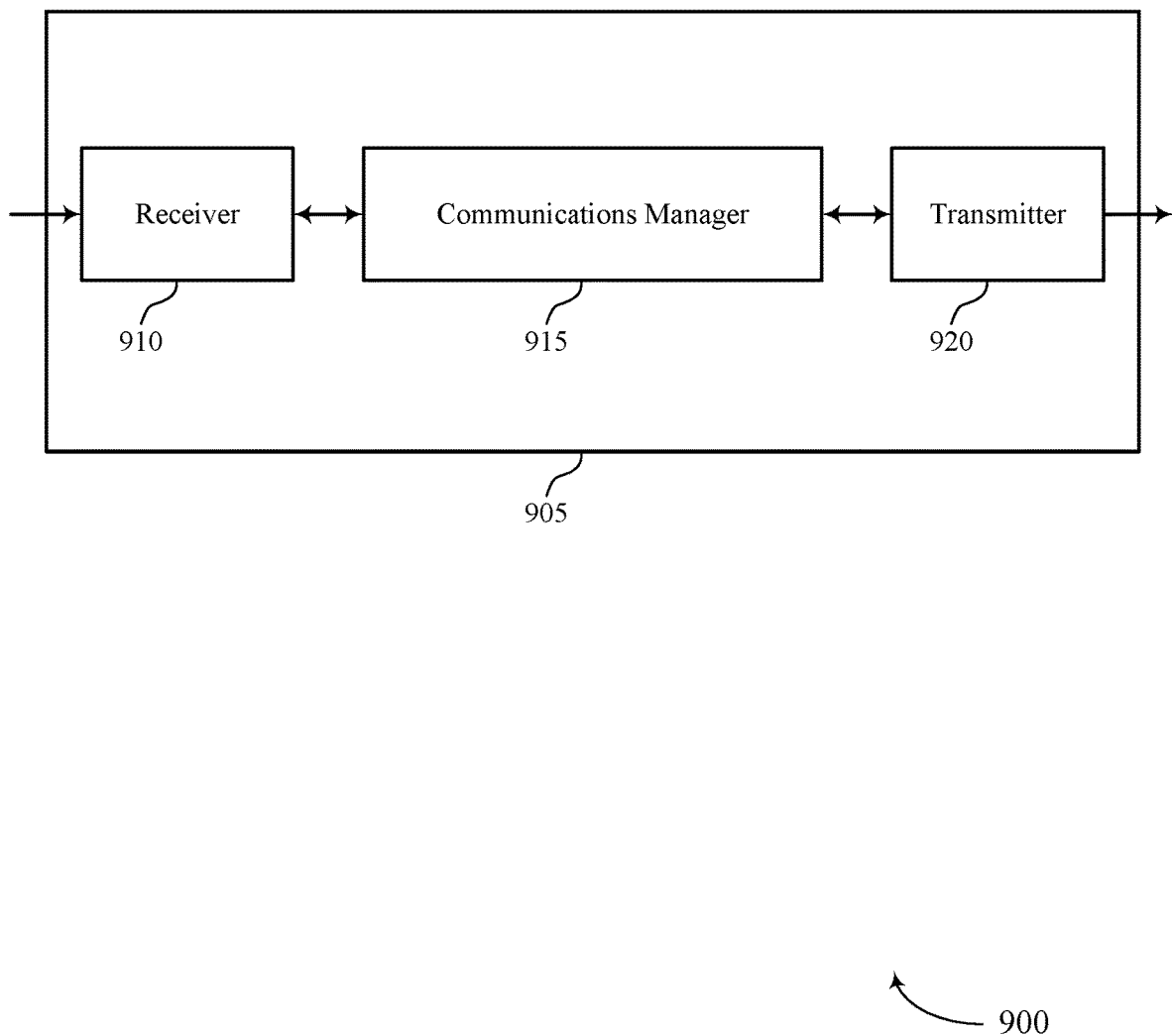
FIGS. 9 and 10 show block diagrams of devices that support random access message differentiation in accordance with aspects of the present disclosure.

FIG. 9 shows a block diagram 900 of a device 905 that supports random access message differentiation in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to random access message differentiation, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE, a random access message associated with a first type of a random access response, the base station supporting the first type and a second type of a random access response during a random access procedure, determine, at least in part in response to the received random access message, a downlink control signal including the random access response of the first type, and transmit the downlink control signal to the UE in a downlink control channel. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
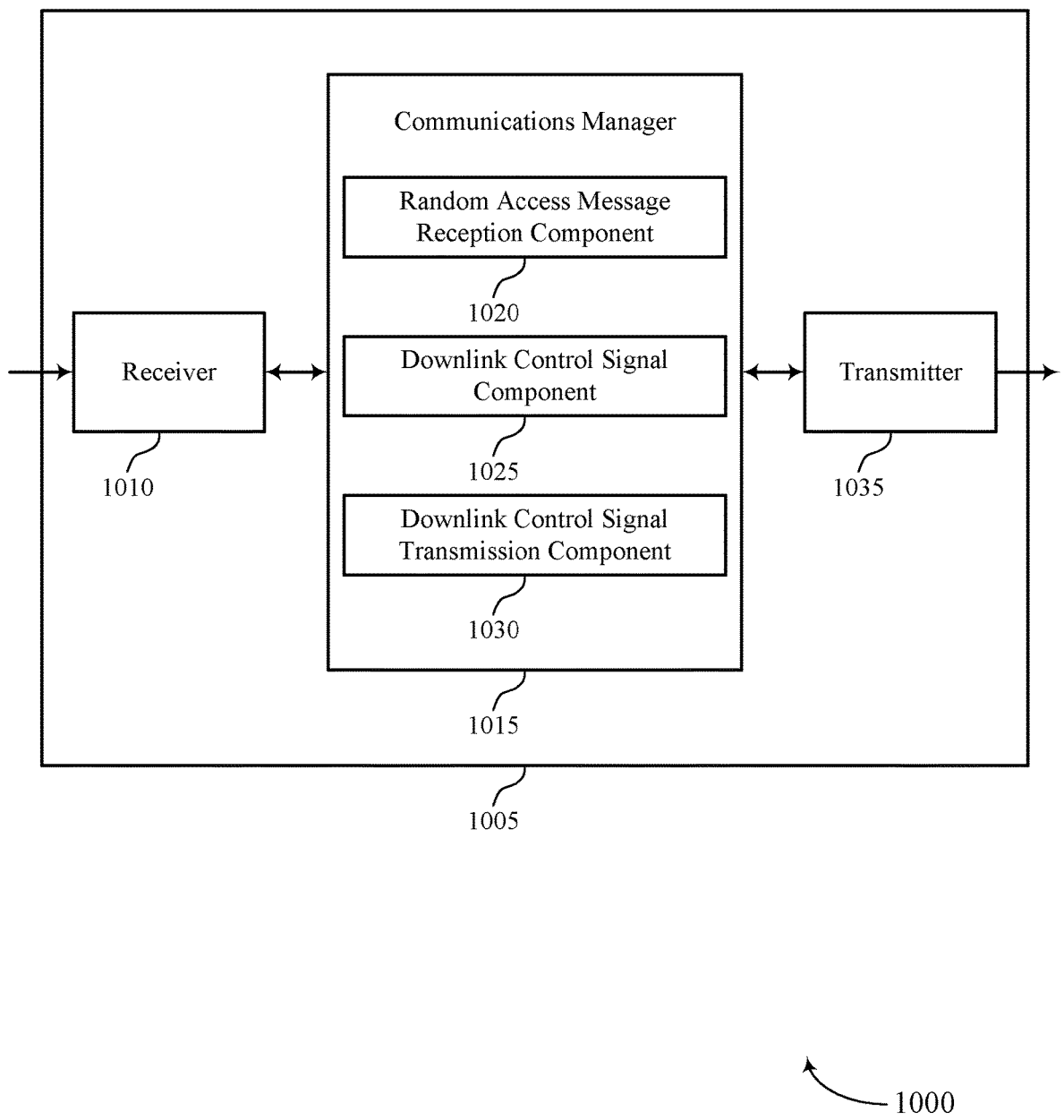

FIG. 10 shows a block diagram 1000 of a device 1005 that supports random access message differentiation in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to random access message differentiation, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a random access message reception component 1020, a downlink control signal component 1025, and a downlink control signal transmission component 1030. The communications manager 1015 may be an example of aspects of the communications manager 1210 described herein.

The random access message reception component 1020 may receive, from a UE, a random access message associated with a first type of a random access response, the base station supporting the first type and a second type of a random access response during a random access procedure. The downlink control signal component 1025 may determine, at least in part in response to the received random access message, a downlink control signal including the random access response of the first type. The downlink control signal transmission component 1030 may transmit the downlink control signal to the UE in a downlink control channel.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
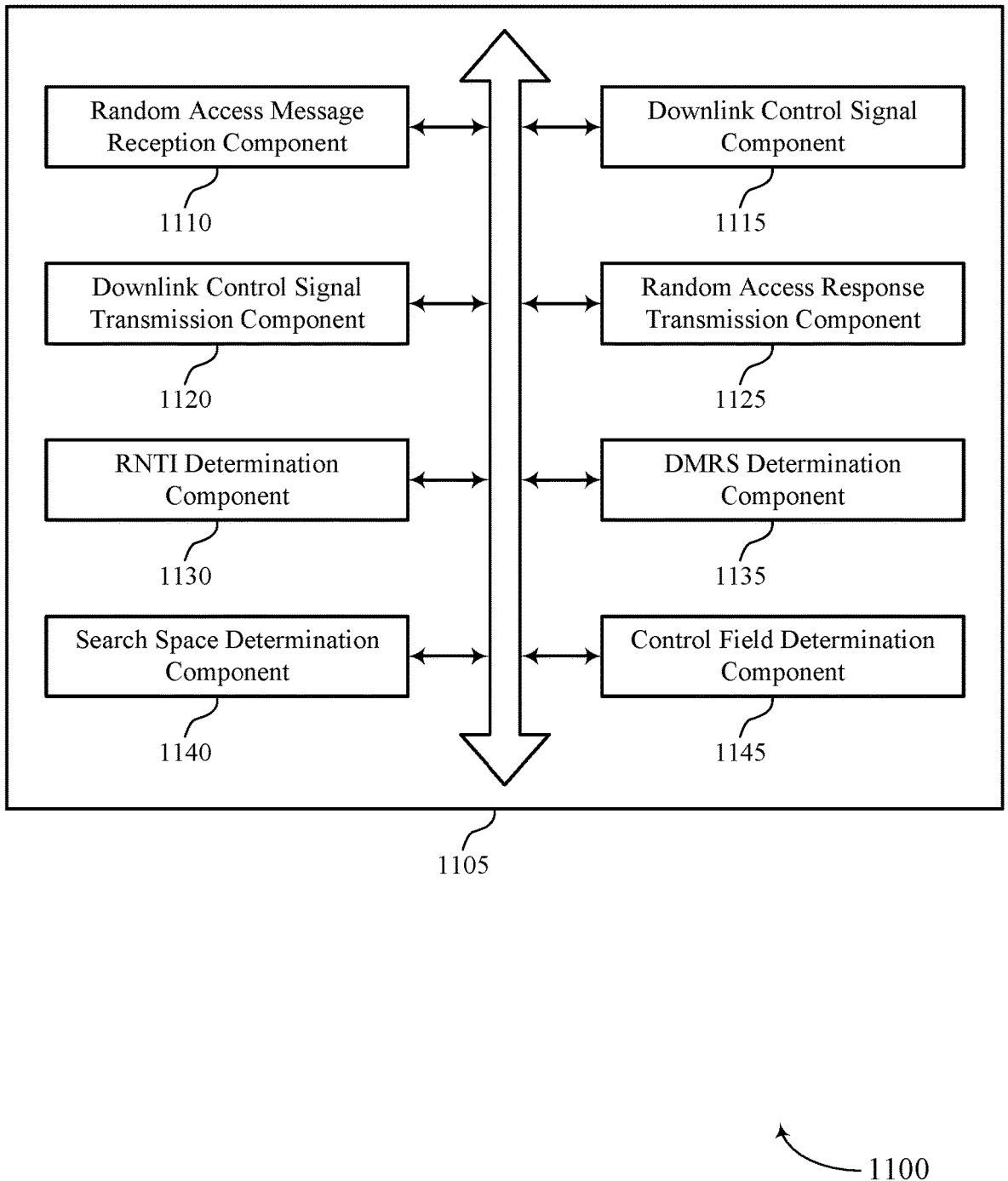
FIG. 11 shows a block diagram of a communications manager that supports random access message differentiation in accordance with aspects of the present disclosure.

FIG. 11 shows a block diagram 1100 of a communications manager 1105 that supports random access message differentiation in accordance with aspects of the present disclosure. The communications manager 1105 may be an example of aspects of a communications manager 915, a communications manager 1015, or a communications manager 1210 described herein. The communications manager 1105 may include a random access message reception component 1110, a downlink control signal component 1115, a downlink control signal transmission component 1120, a random access response transmission component 1125, a RNTI determination component 1130, a DMRS determination component 1135, a search space determination component 1140, and a control field determination component 1145. Each of these modules may communicate, directly or indirectly, with one another (e.g., via one or more buses).

The random access message reception component 1110 may receive, from a UE, a random access message associated with a first type of a random access response, the base station supporting the first type and a second type of a random access response during a random access procedure.

The downlink control signal component 1115 may determine, at least in part in response to the received random access message, a downlink control signal including the random access response of the first type.

The downlink control signal transmission component 1120 may transmit the downlink control signal to the UE in a downlink control channel.

The random access response transmission component 1125 may transmit the random access response of the first type to the UE based on transmitting the downlink control signal to the UE. In some cases, the first type and the second type of the random access response correspond to one or more of different types of random access procedure, different capabilities of the UE, different types of uplink carrier, or different lengths of a random access response window. In some cases, the random access response of the first type is multiplexed with at least one random access response for at least one other UE.

The RNTI determination component 1130 may determine a group RNTI associated with a group of UEs, including the UE, where the group RNTI is based on the first type of the random access response. In some examples, the RNTI determination component 1130 may scramble CRC bits of the downlink control signal using the group RNTI. In some examples, the RNTI determination component 1130 may scramble one or more other CRC bits of one or more other downlink control signals of the second type using a second group RNTI different from the group RNTI, where downlink control messages corresponding to the second type are undecodable using the group RNTI.

In some examples, the RNTI determination component 1130 may calculate the group RNTI based on a random access response window length and a number of bits associated with the group RNTI. In some examples, the RNTI determination component 1130 may calculate the group RNTI based on a maximum value associated with a second group RNTI corresponding to the second type.

The DMRS determination component 1135 may map DMRSs corresponding to the downlink control signal based on the first type of random access response. In some examples, the DMRS determination component 1135 may determine, based on the mapping of the DMRSs, a group RNTI associated with a group of UEs, including the UE. In some examples, the DMRS determination component 1135 may scramble CRC bits of the downlink control signal using the group RNTI.

In some cases, the mapping of the DMRSs includes one or more of a DMRS scrambling identifier, a frequency offset in resource element mapping, an OCC pattern, or a CDM pattern, or a combination thereof. In some cases, the mapping of the DMRSs includes information corresponding to a number of bits and indicating a type of random access response.

The search space determination component 1140 may determine a CORESET or search space, or a combination thereof, associated with the downlink control signal based on the first type of random access response. In some cases, the CORESET or the search space is associated with a bandwidth part corresponding to the first type.

The control field determination component 1145 may determine a field of the downlink control signal based on the first type of random access response. In some cases, the field corresponds to one or more of a reserved field of a DCI or a DCI field dedicated to indicating a type of random access response, or a combination thereof. In some examples, the control field determination component 1145 may determine a group RNTI based on the received random access message, the group RNTI associated with a group of UEs, including the UE. In some examples, the control field determination component 1145 may scramble CRC bits of the downlink control signal using the group RNTI.

Figure 12:
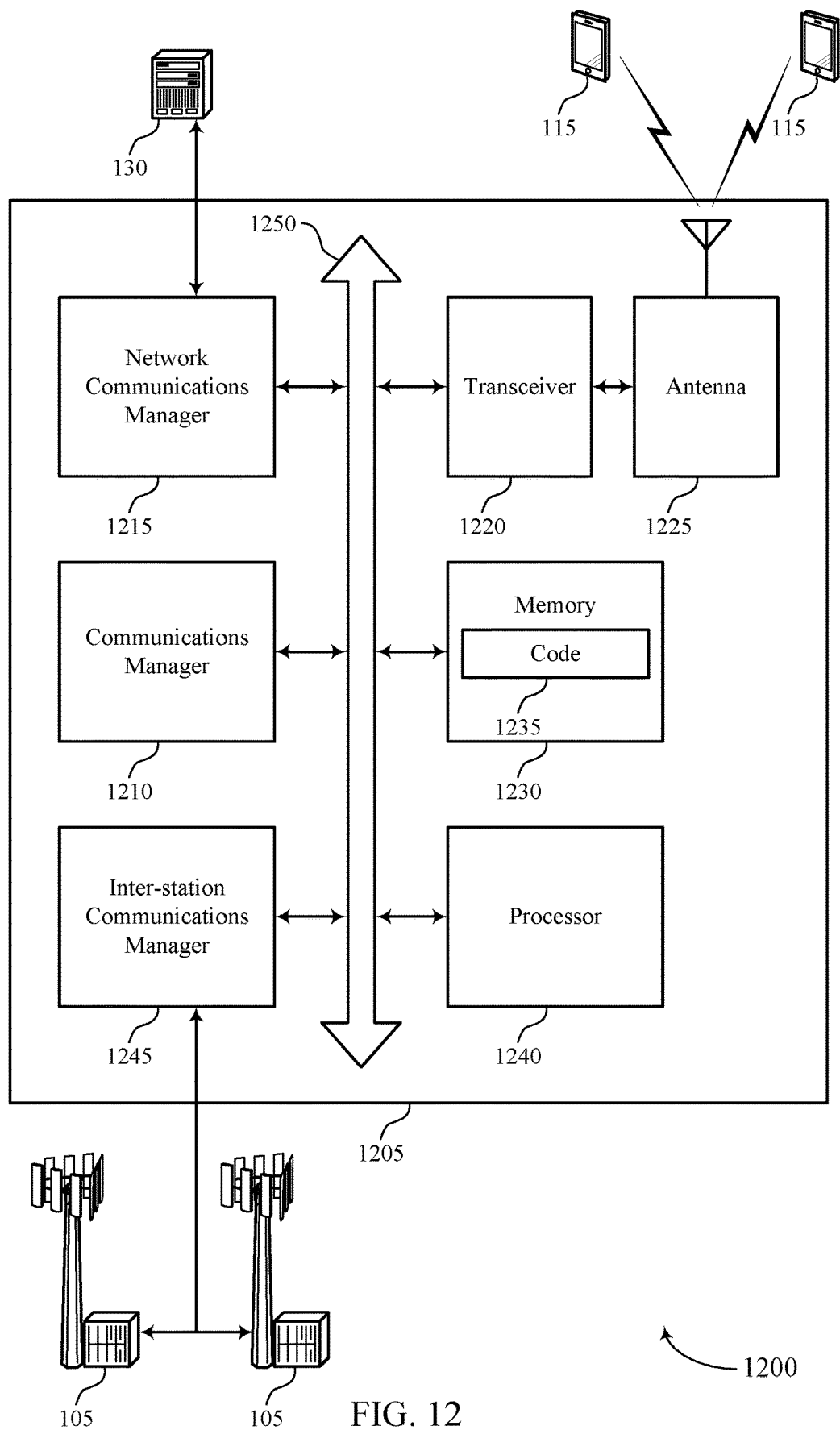
FIG. 12 shows a diagram of a system including a device that supports random access message differentiation in accordance with aspects of the present disclosure.

FIG. 12 shows a diagram of a system 1200 including a device 1205 that supports random access message differentiation in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a UE, a random access message associated with a first type of a random access response, the base station supporting the first type and a second type of a random access response during a random access procedure, determine, at least in part in response to the received random access message, a downlink control signal including the random access response of the first type, and transmit the downlink control signal to the UE in a downlink control channel.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting random access message differentiation).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
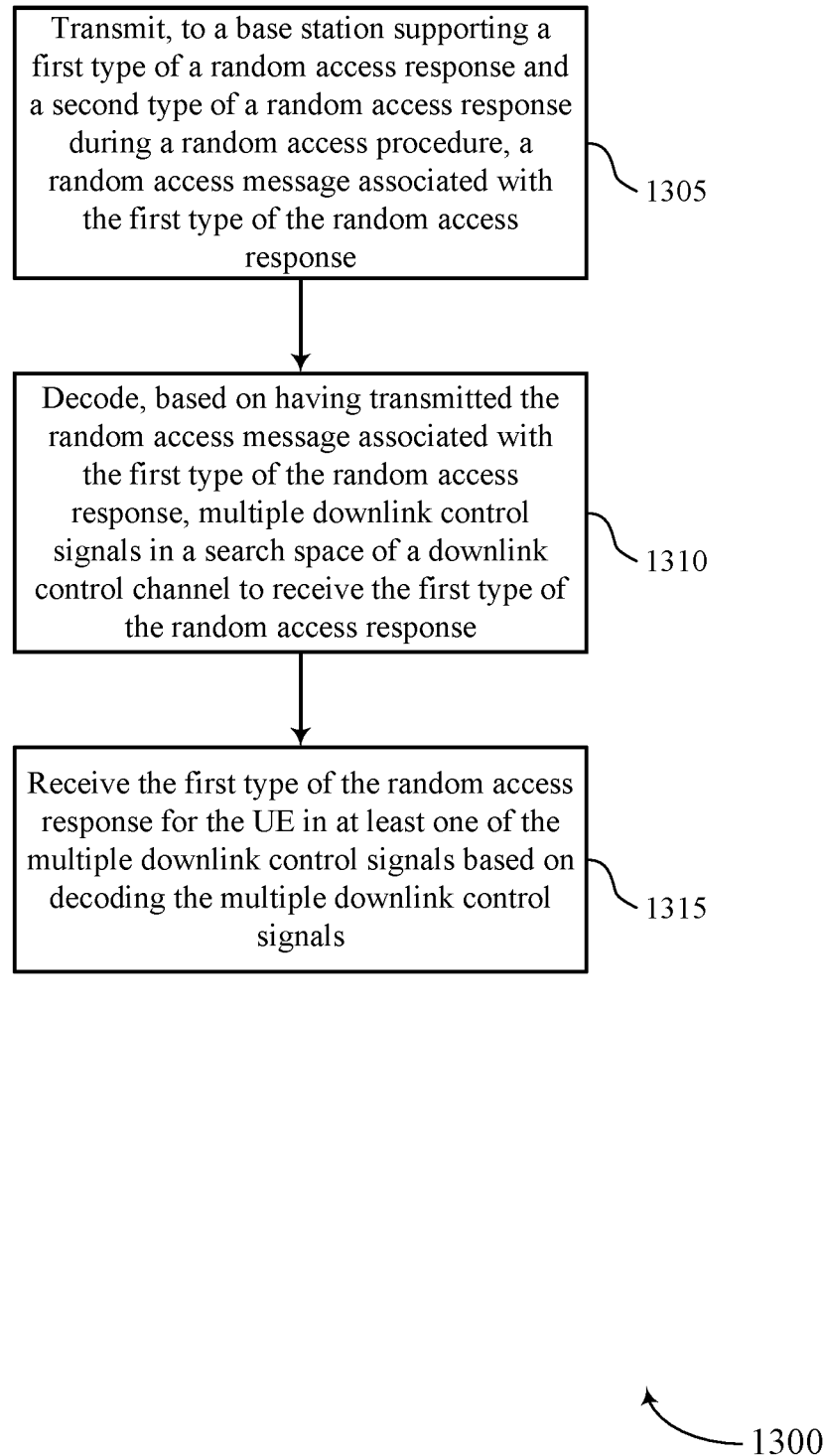
FIGS. 13 through 19 show flowcharts illustrating methods that support random access message differentiation in accordance with aspects of the present disclosure.

FIG. 13 shows a flowchart illustrating a method 1300 that supports random access message differentiation in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may transmit, to a base station supporting a first type and a second type of a random access response during a random access procedure, a random access message associated with the first type of the random access response. The operations of 1305 may be performed according to the methods described herein. In some examples, aspects of the operations of 1305 may be performed by a random access message transmission component as described with reference to FIGS. 5 through 8.

At 1310, the UE may decode, based on having transmitted the random access message of the first type, multiple downlink control signals in a search space of a downlink control channel to receive the random access response of the first type. The operations of 1310 may be performed according to the methods described herein. In some examples, aspects of the operations of 1310 may be performed by a control signal decoding component as described with reference to FIGS. 5 through 8.

At 1315, the UE may receive the random access response of the first type for the UE in at least one of the multiple downlink control signals based on decoding the multiple downlink control signals. The operations of 1315 may be performed according to the methods described herein. In some examples, aspects of the operations of 1315 may be performed by a random access response reception component as described with reference to FIGS. 5 through 8.

Figure 14:
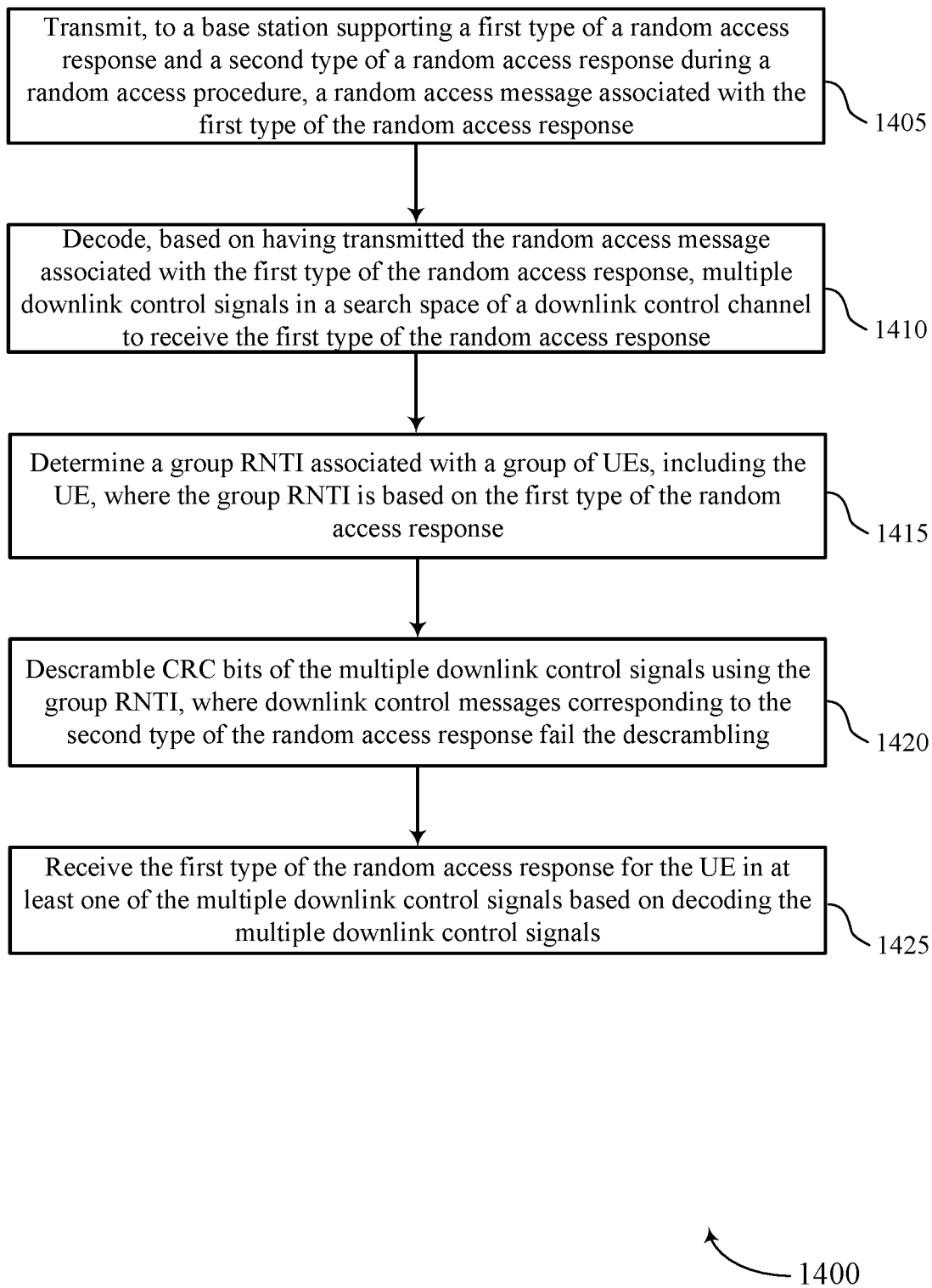

FIG. 14 shows a flowchart illustrating a method 1400 that supports random access message differentiation in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may transmit, to a base station supporting a first type and a second type of a random access response during a random access procedure, a random access message associated with the first type of the random access response. The operations of 1405 may be performed according to the methods described herein. In some examples, aspects of the operations of 1405 may be performed by a random access message transmission component as described with reference to FIGS. 5 through 8.

At 1410, the UE may decode, based on having transmitted the random access message of the first type, multiple downlink control signals in a search space of a downlink control channel to receive the random access response of the first type. The operations of 1410 may be performed according to the methods described herein. In some examples, aspects of the operations of 1410 may be performed by a control signal decoding component as described with reference to FIGS. 5 through 8.

At 1415, the UE may determine a group RNTI associated with a group of UEs, including the UE, where the group RNTI is based on the first type of the random access response. The operations of 1415 may be performed according to the methods described herein. In some examples, aspects of the operations of 1415 may be performed by a RNTI component as described with reference to FIGS. 5 through 8.

At 1420, the UE may descramble CRC bits of the multiple downlink control signals using the group RNTI, where downlink control messages corresponding to the second type fail the descrambling. The operations of 1420 may be performed according to the methods described herein. In some examples, aspects of the operations of 1420 may be performed by a RNTI component as described with reference to FIGS. 5 through 8.

At 1425, the UE may receive the random access response of the first type for the UE in at least one of the multiple downlink control signals based on decoding the multiple downlink control signals. The operations of 1425 may be performed according to the methods described herein. In some examples, aspects of the operations of 1425 may be performed by a random access response reception component as described with reference to FIGS. 5 through 8.

Figure 15:
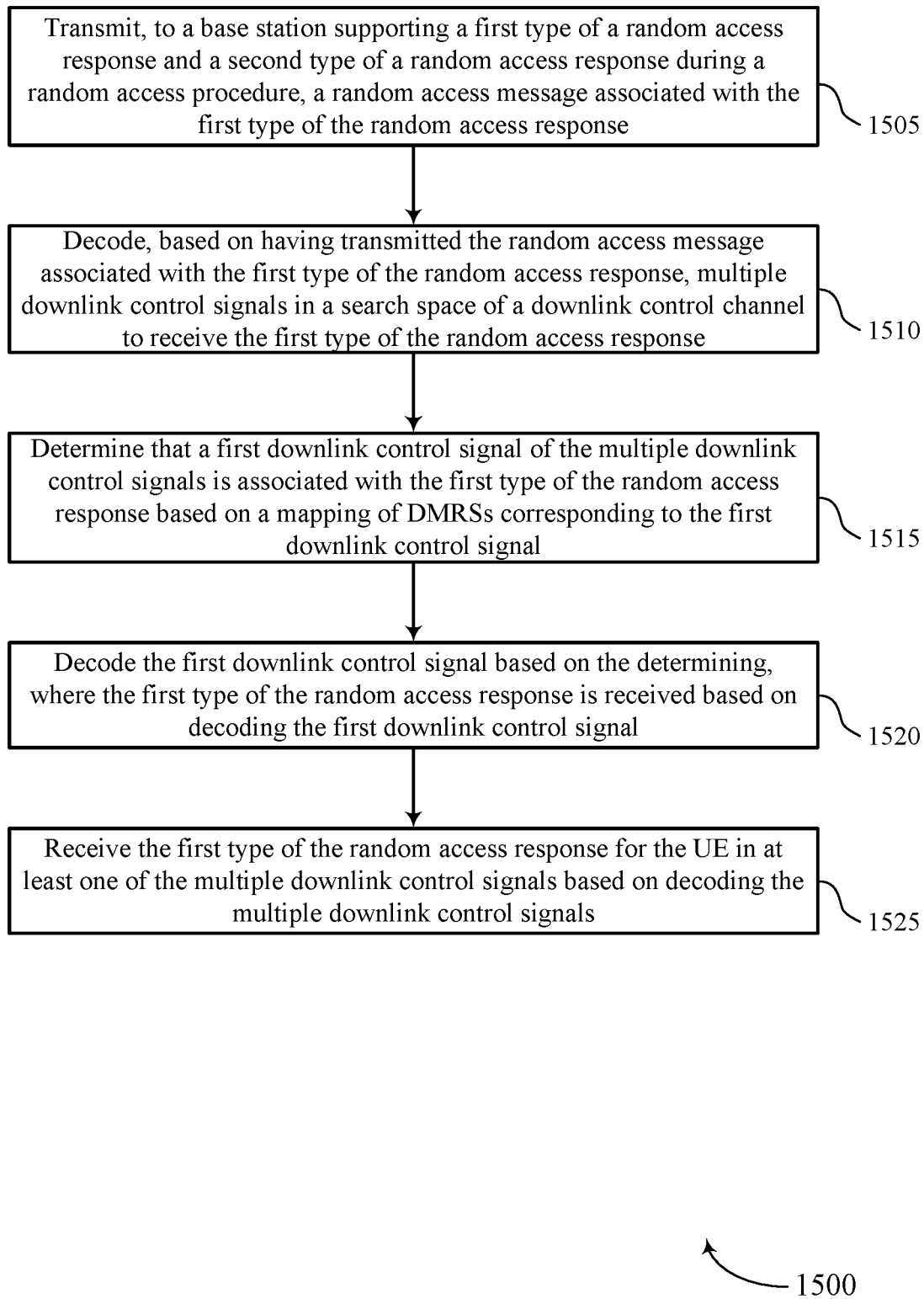

FIG. 15 shows a flowchart illustrating a method 1500 that supports random access message differentiation in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may transmit, to a base station supporting a first type and a second type of a random access response during a random access procedure, a random access message associated with the first type of the random access response. The operations of 1505 may be performed according to the methods described herein. In some examples, aspects of the operations of 1505 may be performed by a random access message transmission component as described with reference to FIGS. 5 through 8.

At 1510, the UE may decode, based on having transmitted the random access message of the first type, multiple downlink control signals in a search space of a downlink control channel to receive the random access response of the first type. The operations of 1510 may be performed according to the methods described herein. In some examples, aspects of the operations of 1510 may be performed by a control signal decoding component as described with reference to FIGS. 5 through 8.

At 1515, the UE may determine that a first downlink control signal of the multiple downlink control signals is associated with the first type based on a mapping of DMRSs corresponding to the first downlink control signal. The operations of 1515 may be performed according to the methods described herein. In some examples, aspects of the operations of 1515 may be performed by a DMRS component as described with reference to FIGS. 5 through 8.

At 1520, the UE may decode the first downlink control signal based on the determining, where the random access response of the first type is received based on decoding the first downlink control signal. The operations of 1520 may be performed according to the methods described herein. In some examples, aspects of the operations of 1520 may be performed by a DMRS component as described with reference to FIGS. 5 through 8.

At 1525, the UE may receive the random access response of the first type for the UE in at least one of the multiple downlink control signals based on decoding the multiple downlink control signals. The operations of 1525 may be performed according to the methods described herein. In some examples, aspects of the operations of 1525 may be performed by a random access response reception component as described with reference to FIGS. 5 through 8.

Figure 16:
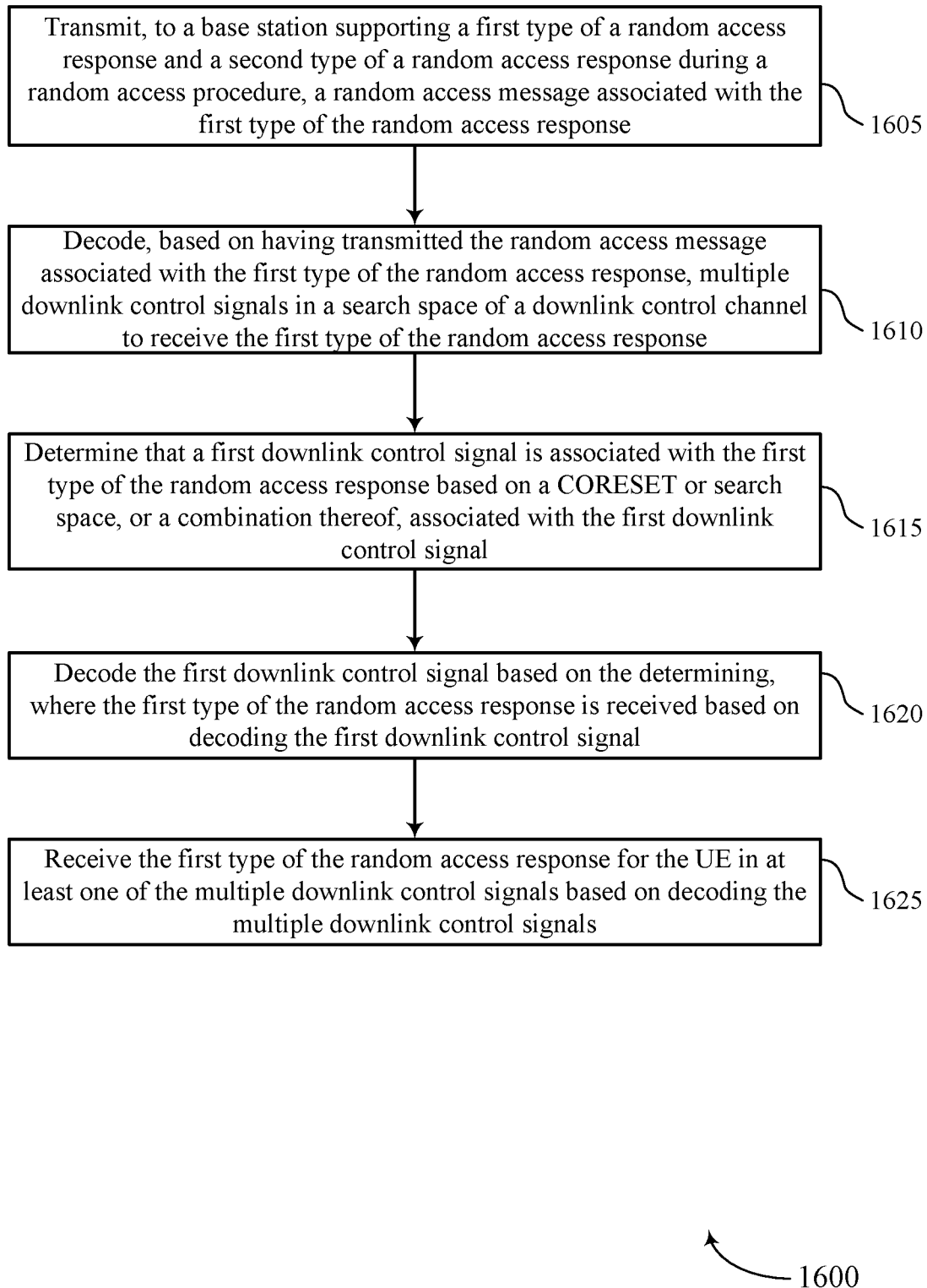

FIG. 16 shows a flowchart illustrating a method 1600 that supports random access message differentiation in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may transmit, to a base station supporting a first type and a second type of a random access response during a random access procedure, a random access message associated with the first type of the random access response. The operations of 1605 may be performed according to the methods described herein. In some examples, aspects of the operations of 1605 may be performed by a random access message transmission component as described with reference to FIGS. 5 through 8.

At 1610, the UE may decode, based on having transmitted the random access message of the first type, multiple downlink control signals in a search space of a downlink control channel to receive the random access response of the first type. The operations of 1610 may be performed according to the methods described herein. In some examples, aspects of the operations of 1610 may be performed by a control signal decoding component as described with reference to FIGS. 5 through 8.

At 1615, the UE may determine that a first downlink control signal is associated with the first type based on a CORESET or search space, or a combination thereof, associated with the first downlink control signal. The operations of 1615 may be performed according to the methods described herein. In some examples, aspects of the operations of 1615 may be performed by a search space component as described with reference to FIGS. 5 through 8.

At 1620, the UE may decode the first downlink control signal based on the determining, where the random access response of the first type is received based on decoding the first downlink control signal. The operations of 1620 may be performed according to the methods described herein. In some examples, aspects of the operations of 1620 may be performed by a search space component as described with reference to FIGS. 5 through 8.

At 1625, the UE may receive the random access response of the first type for the UE in at least one of the multiple downlink control signals based on decoding the multiple downlink control signals. The operations of 1625 may be performed according to the methods described herein. In some examples, aspects of the operations of 1625 may be performed by a random access response reception component as described with reference to FIGS. 5 through 8.

Figure 17:
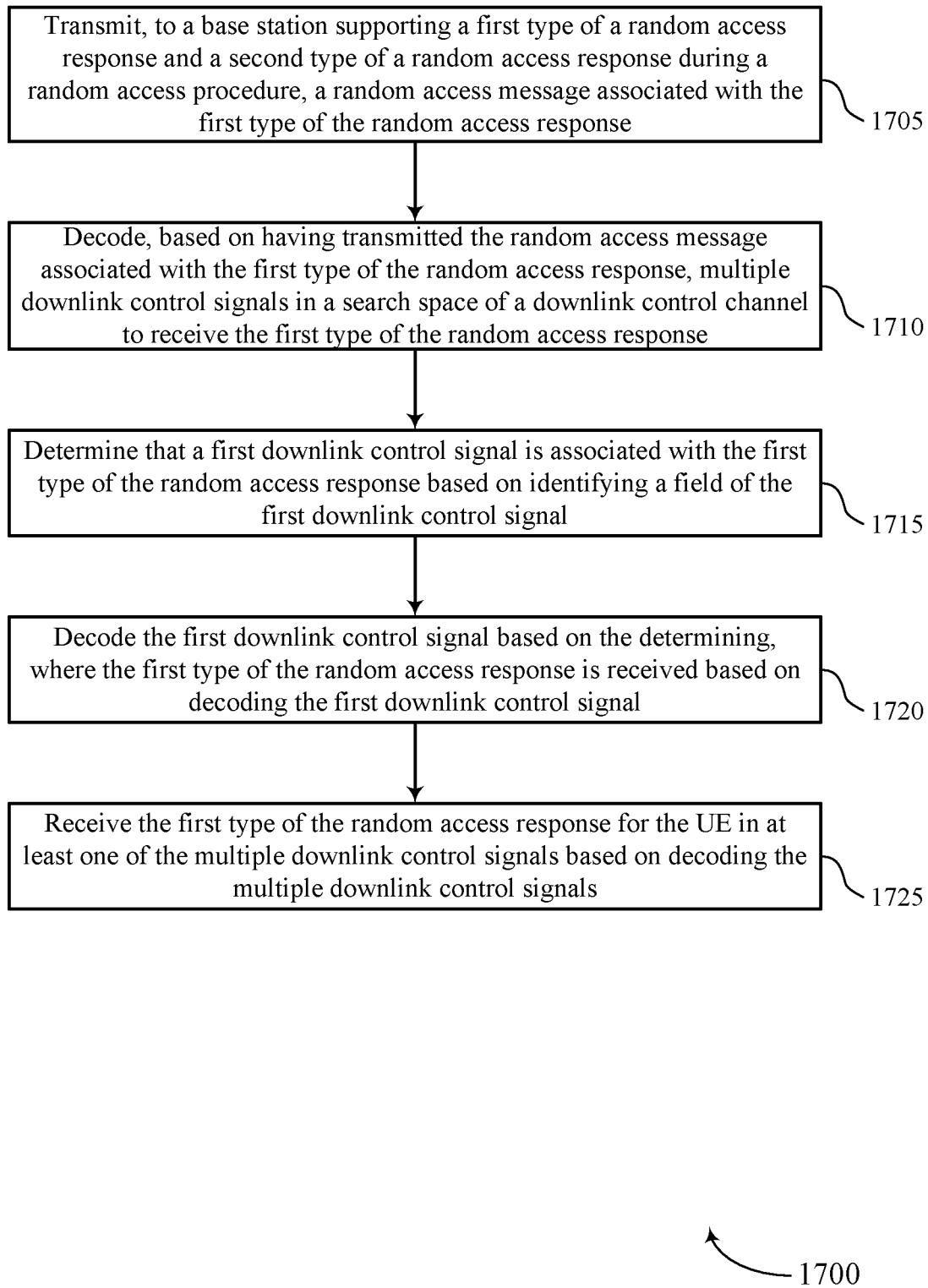

FIG. 17 shows a flowchart illustrating a method 1700 that supports random access message differentiation in accordance with aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1705, the UE may transmit, to a base station supporting a first type and a second type of a random access response during a random access procedure, a random access message associated with the first type of the random access response. The operations of 1705 may be performed according to the methods described herein. In some examples, aspects of the operations of 1705 may be performed by a random access message transmission component as described with reference to FIGS. 5 through 8.

At 1710, the UE may decode, based on having transmitted the random access message of the first type, multiple downlink control signals in a search space of a downlink control channel to receive the random access response of the first type. The operations of 1710 may be performed according to the methods described herein. In some examples, aspects of the operations of 1710 may be performed by a control signal decoding component as described with reference to FIGS. 5 through 8.

At 1715, the UE may determine that a first downlink control signal is associated with the first type based on identifying a field of the first downlink control signal. The operations of 1715 may be performed according to the methods described herein. In some examples, aspects of the operations of 1715 may be performed by a downlink control field component as described with reference to FIGS. 5 through 8.

At 1720, the UE may decode the first downlink control signal based on the determining, where the random access response of the first type is received based on decoding the first downlink control signal. The operations of 1720 may be performed according to the methods described herein. In some examples, aspects of the operations of 1720 may be performed by a downlink control field component as described with reference to FIGS. 5 through 8.

At 1725, the UE may receive the random access response of the first type for the UE in at least one of the multiple downlink control signals based on decoding the multiple downlink control signals. The operations of 1725 may be performed according to the methods described herein. In some examples, aspects of the operations of 1725 may be performed by a random access response reception component as described with reference to FIGS. 5 through 8.

Figure 18:
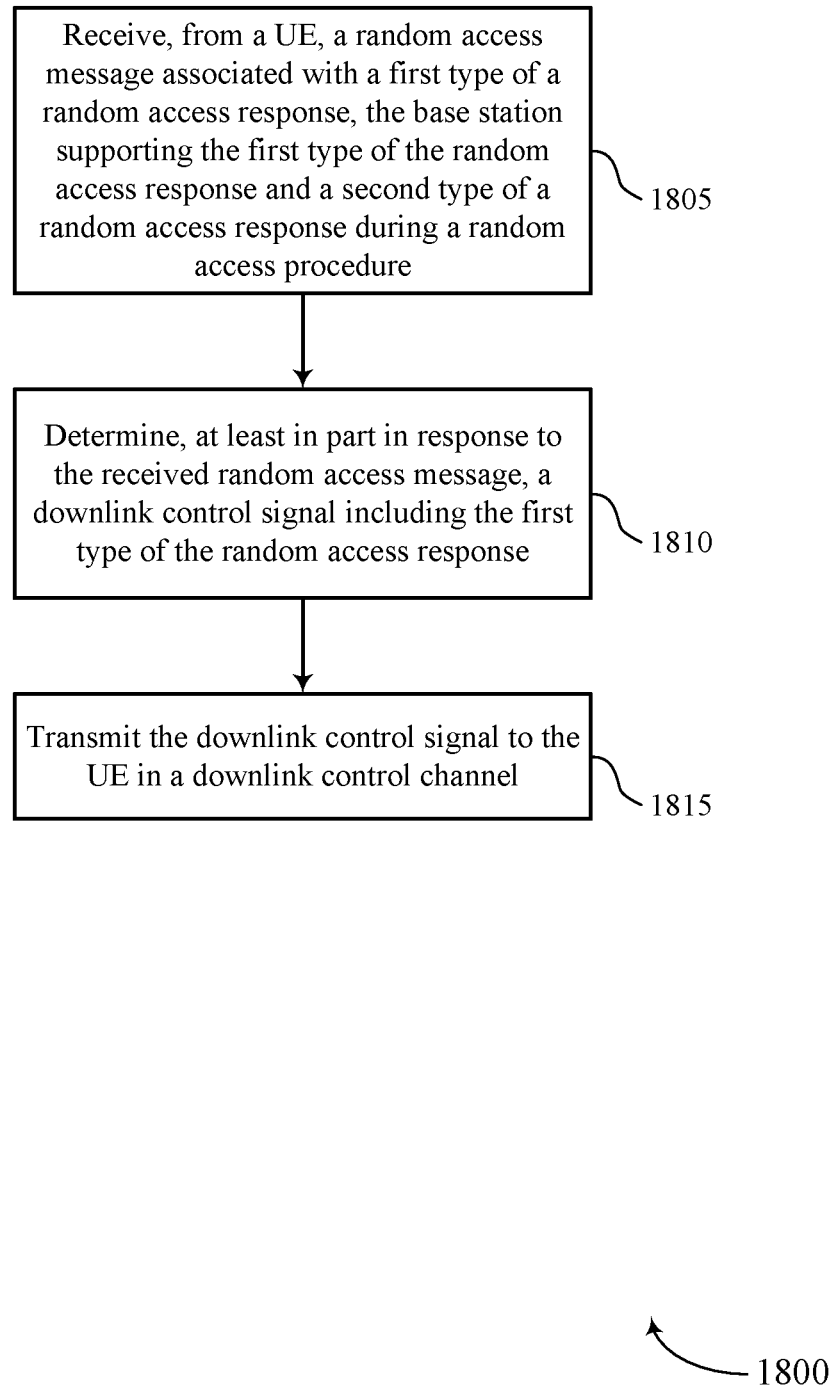

FIG. 18 shows a flowchart illustrating a method 1800 that supports random access message differentiation in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may receive, from a UE, a random access message associated with a first type of a random access response, the base station supporting the first type and a second type of a random access response during a random access procedure. The operations of 1805 may be performed according to the methods described herein. In some examples, aspects of the operations of 1805 may be performed by a random access message reception component as described with reference to FIGS. 9 through 12.

At 1810, the base station may determine, at least in part in response to the received random access message, a downlink control signal including the random access response of the first type. The operations of 1810 may be performed according to the methods described herein. In some examples, aspects of the operations of 1810 may be performed by a downlink control signal component as described with reference to FIGS. 9 through 12.

At 1815, the base station may transmit the downlink control signal to the UE in a downlink control channel. The operations of 1815 may be performed according to the methods described herein. In some examples, aspects of the operations of 1815 may be performed by a downlink control signal transmission component as described with reference to FIGS. 9 through 12.

Figure 19:
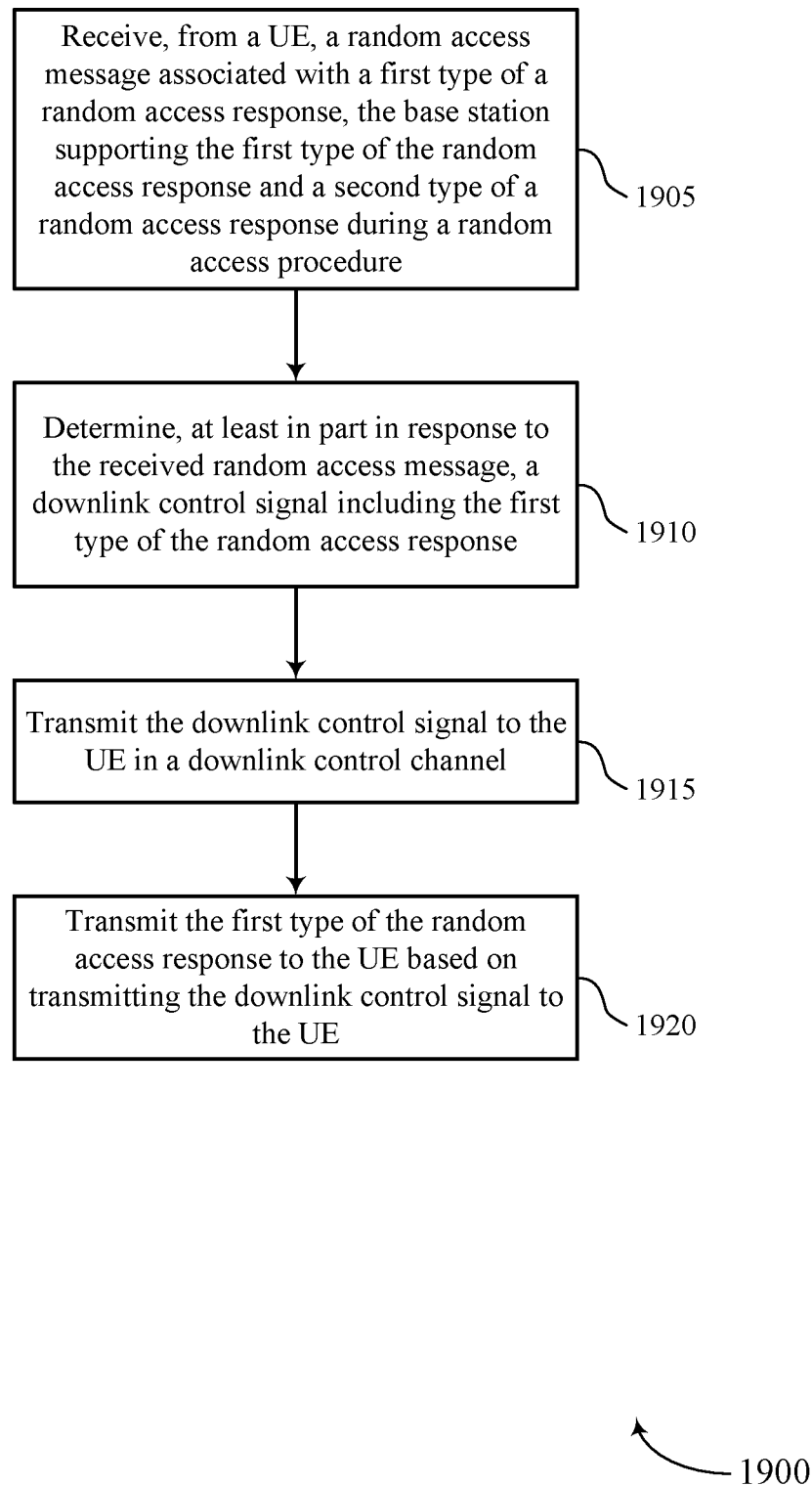

FIG. 19 shows a flowchart illustrating a method 1900 that supports random access message differentiation in accordance with aspects of the present disclosure. The operations of method 1900 may be implemented by a base station 105 or its components as described herein. For example, the operations of method 1900 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1905, the base station may receive, from a UE, a random access message associated with a first type of a random access response, the base station supporting the first type and a second type of a random access response during a random access procedure. The operations of 1905 may be performed according to the methods described herein. In some examples, aspects of the operations of 1905 may be performed by a random access message reception component as described with reference to FIGS. 9 through 12.

At 1910, the base station may determine, at least in part in response to the received random access message, a downlink control signal including the random access response of the first type. The operations of 1910 may be performed according to the methods described herein. In some examples, aspects of the operations of 1910 may be performed by a downlink control signal component as described with reference to FIGS. 9 through 12.

At 1915, the base station may transmit the downlink control signal to the UE in a downlink control channel. The operations of 1915 may be performed according to the methods described herein. In some examples, aspects of the operations of 1915 may be performed by a downlink control signal transmission component as described with reference to FIGS. 9 through 12.

At 1920, the base station may transmit the random access response of the first type to the UE based on transmitting the downlink control signal to the UE. The operations of 1920 may be performed according to the methods described herein. In some examples, aspects of the operations of 1920 may be performed by a random access response transmission component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
one or more memories; and
one or more processors coupled to the one or more memories and configured to:
transmit, to a network device supporting a first type of a random access response and a second type of a random access response during a random access procedure, a random access message associated with the first type of the random access response;
decode, based at least in part on having transmitted the random access message associated with the first type of the random access response, a plurality of downlink control signals in a search space of a downlink control channel to receive the first type of the random access response wherein the decoding of the plurality of downlink control signals further comprises to:
determine that a first downlink control signal is associated with the first type of the random access response based at least in part on a control resource set or search space, or a combination thereof, associated with the first downlink control signal; and
decode the first downlink control signal based at least in part on the determining, wherein the first type of the random access response is received based at least in part on decoding the first downlink control signal; and
receive the first type of the random access response for the UE in at least one of the plurality of downlink control signals based at least in part on decoding the plurality of downlink control signals.

2. The apparatus of claim 1, wherein the first type of the random access response and the second type of the random access response correspond to one or more of different types of random access procedure, different capabilities of the UE, different types of uplink carrier, or different lengths of a random access response window.

3. The apparatus of claim 1, wherein the first type of the random access response is multiplexed with at least one random access response of the second type for at least one other UE.

4. The apparatus of claim 1, wherein to decode the plurality of downlink control signals, the one or more processors are further configured to:
extract a demodulation reference signal associated with the downlink control channel;
perform a channel estimation based at least in part on a decorrelation of the demodulation reference signal, wherein decoding the plurality of downlink control signals is based at least in part on performing the channel estimation;
determine a group radio network temporary identifier associated with a group of UEs, including the UE, wherein the group radio network temporary identifier is based at least in part on the first type of the random access response;
descramble cyclic redundancy check bits of the plurality of downlink control signals using the group radio network temporary identifier;
determine that the first downlink control signal of the plurality of downlink control signals is decodable using the demodulation reference signal for channel estimation and the group radio network temporary identifier based at least in part on descrambling the cyclic redundancy check bits; and
decode the first downlink control signal based at least in part on the determining, wherein the first type of the random access response is received based at least in part on decoding the first downlink control signal.

5. The apparatus of claim 4, wherein to determine the group radio network temporary identifier, the one or more processors are further configured to:
calculate the group radio network temporary identifier based at least in part on a maximum value associated with a second group radio network temporary identifier corresponding to the second type of the random access response.

6. The apparatus of claim 1, wherein to decode the plurality of downlink control signals, the one or more processors are further configured to:
determine that the first downlink control signal of the plurality of downlink control signals is associated with the first type of the random access response based at least in part on a mapping of demodulation reference signals corresponding to the first downlink control signal, wherein the mapping of the demodulation reference signals is based at least in part on one or more of a demodulation reference signal scrambling identifier, a frequency offset in resource element mapping, an orthogonal cover code pattern, or a code division multiplexing pattern, or a combination thereof; and
decode the first downlink control signal based at least in part on the determining, wherein the first type of the random access response is received based at least in part on decoding the first downlink control signal.

7. The apparatus of claim 6, wherein the one or more processors are further configured to:
determine, based at least in part on the mapping of the demodulation reference signals, a group radio network temporary identifier associated with a group of UEs, including the UE;
descramble cyclic redundancy check bits of the plurality of downlink control signals using the group radio network temporary identifier;
generate multiple hypotheses corresponding to the mapping of demodulation reference signals of the plurality of downlink control signals; and
perform a cross-correlation based at least in part on the multiple hypotheses and the plurality of downlink control signals, wherein the first downlink control signal is determined to be associated with the first type of the random access response based at least in part on performing the cross-correlation.

8. The apparatus of claim 1, wherein the control resource set or the search space, or a combination thereof, are associated with a bandwidth part corresponding to the first type of the random access response.

9. The apparatus of claim 1, wherein to decode the plurality of downlink control signals, the one or more processors are further configured to:
determine that the first downlink control signal is associated with the first type of the random access response based at least in part on identifying a field of the first downlink control signal; and
decode the first downlink control signal based at least in part on the determining, wherein the first type of the random access response is received based at least in part on decoding the first downlink control signal.

10. The apparatus of claim 9, wherein the field corresponds to one or more of a reserved field of a downlink control information or a downlink control information field dedicated to indicating a type of random access response, or a combination thereof.

11. The apparatus of claim 9, wherein the one or more processors are further configured to:
determine a group radio network temporary identifier based at least in part on the transmitted random access message, the group radio network temporary identifier associated with a group of UEs, including the UE;
descramble cyclic redundancy check bits of the plurality of downlink control signals using the group radio network temporary identifier;
determine that a first set of downlink control signals is decodable and that a second set of downlink control signals is undecodable based at least in part on descrambling the cyclic redundancy check bits using the group radio network temporary identifier;
abort decoding of the second set of downlink control signals based at least in part on determining that the second set of downlink control signals is undecodable;
decode a second field associated with the first set of downlink control signals, wherein the field of the first downlink control signal is identified based at least in part on the decoding; and
abort decoding of one or more other random access responses associated with downlink control signals of the first set different from the first downlink control signal based at least in part on decoding the second field.

12. An apparatus for wireless communication at a network device, comprising:
one or more memories; and
one or more processors coupled to the one or more memories and configured to:
receive a random access message associated with a first type of a random access response, the network device supporting the first type of the random access response and a second type of a random access response during a random access procedure;
determine a control resource set or search space, or a combination thereof, associated with a downlink control signal based at least in part on the first type of the random access response, wherein the control resource set or the search space is associated with a bandwidth part corresponding to the first type of the random access response;
generate, at least in part in response to the received random access message, the downlink control signal comprising the first type of the random access response; and
transmit the downlink control signal comprising the first type of the random access response in a downlink control channel.

13. The apparatus of claim 12, wherein the first type of the random access response and the second type of the random access response correspond to one or more of different types of random access procedure, different capabilities of a UE, different types of uplink carrier, or different lengths of a random access response window.

14. The apparatus of claim 12, wherein the first type of the random access response is multiplexed with at least one random access response of the second type for at least one other UE.

15. The apparatus of claim 12, wherein to determine the downlink control signal, the one or more processors are further configured to:
determine a group radio network temporary identifier associated with a group of UEs, wherein the group radio network temporary identifier is based at least in part on the first type of the random access response; and
scramble cyclic redundancy check bits of the downlink control signal using the group radio network temporary identifier.

16. The apparatus of claim 15, wherein to determine the group radio network temporary identifier, the one or more processors are further configured to:
calculate the group radio network temporary identifier based at least in part on a maximum value associated with a second group radio network temporary identifier corresponding to the second type of the random access response.

17. The apparatus of claim 12, wherein to determine the downlink control signal, the one or more processors are further configured to:
map demodulation reference signals corresponding to the downlink control signal based at least in part on the first type of random access response, wherein the mapping of the demodulation reference signals is based at least in part on one or more of a demodulation reference signal scrambling identifier, a frequency offset in resource element mapping, an orthogonal cover code pattern, or a code division multiplexing pattern, or a combination thereof.

18. The apparatus of claim 17, wherein the one or more processors are further configured to:
determine, based at least in part on the mapping of the demodulation reference signals, a group radio network temporary identifier associated with a group of UEs; and
scramble cyclic redundancy check bits of the downlink control signal using the group radio network temporary identifier.

19. The apparatus of claim 12, wherein to determine the downlink control signal, the one or more processors are further configured to:
determine a field of the downlink control signal based at least in part on the first type of the random access response.

20. The apparatus of claim 19, wherein the field corresponds to one or more of a reserved field of a downlink control information or a downlink control information field dedicated to indicating a type of random access response, or a combination thereof.

21. The apparatus of claim 19, wherein the one or more processors are further configured to:
- determine a group radio network temporary identifier based at least in part on the received random access message, the group radio network temporary identifier associated with a group of UEs; and
- scramble cyclic redundancy check bits of the downlink control signal using the group radio network temporary identifier.

22. A method for wireless communication at a user equipment (UE), comprising:
- transmitting, to a network device supporting a first type of a random access response and a second type of a random access response during a random access procedure, a random access message associated with the first type of the random access response;
- decoding, based at least in part on having transmitted the random access message associated with the first type of the random access response, a plurality of downlink control signals in a search space of a downlink control channel to receive the first type of the random access response, wherein the decoding of the plurality of downlink control signals further comprises:
- determining that a first downlink control signal is associated with the first type of the random access response based at least in part on a control resource set or search space, or a combination thereof, associated with the first downlink control signal; and
- decoding the first downlink control signal based at least in part on the determining, wherein the first type of the random access response is received based at least in part on decoding the first downlink control signal; and
- receiving the first type of the random access response for the UE in at least one of the plurality of downlink control signals based at least in part on decoding the plurality of downlink control signals.

23. A method for wireless communication at a network device, comprising:
- receiving a random access message associated with a first type of a random access response, the network device supporting the first type of the random access response and a second type of a random access response during a random access procedure;
- determine a control resource set or search space, or a combination thereof, associated with a downlink control signal based at least in part on the first type of the random access response, wherein the control resource set or the search space is associated with a bandwidth part corresponding to the first type of the random access response;
- generating, at least in part in response to the received random access message, the downlink control signal comprising the first type of the random access response; and
- transmitting the downlink control signal comprising the first type of the random access response in a downlink control channel.

\* \* \* \* \*